United States Patent [19]

Hamada et al.

[11] Patent Number: 5,048,941

[45] Date of Patent: Sep. 17, 1991

[54] SURGICAL MISCROSCOPE WITH A MODULAR STAND

[75] Inventors: Masami Hamada, Setagaya; Hiroshi Fujiwara; Kosaku Tsuboshima, both of Hachiouji; Masahiko Kinukawa, Higashimurayama; Toshiyuki Tsunoda, Matsumoto; Takashi Nagano, Hachiouji; Kazyuki Minami, Musashino; Shigeo Tokunaga, Hino; Masanori Kaneda; Tomonori Ishikawa, Hachiouji, all of Japan

[73] Assignee: Olympus Optical Co., Ltd., Tokyo, Japan

[21] Appl. No.: 417,438

[22] Filed: Oct. 5, 1989

[30] Foreign Application Priority Data

Oct. 7, 1988 [JP] Japan ............................ 63-130922[U]
Sep. 18, 1989 [JP] Japan ................................. 1-108723

[51] Int. Cl.⁵ .......................................... G02B 21/24
[52] U.S. Cl. ..................................... 359/368; 307/43
[58] Field of Search ............... 350/507, 511, 513–516, 350/518, 521, 522, 505, 508, 520; 307/11, 18, 19, 25–29, 38, 39, 43, 150, 154; 318/568.2, 568.24, 105–110; 901/19, 23, 24, 50

[56] References Cited

U.S. PATENT DOCUMENTS 4,523,732 6/1985 Biber et al. .................... 248/123.1
4,878,746 11/1989 Nakano et al. .................... 350/507
4,912,388 3/1990 Tanaka et al. .................... 318/640

FOREIGN PATENT DOCUMENTS 0048404 3/1982 European Pat. Off. .
80249623 6/1982 Fed. Rep. of Germany .
57-86806 5/1982 Japan .
6419318 1/1989 Japan .

Primary Examiner—J. R. Scott
Assistant Examiner—David Osborn
Attorney, Agent, or Firm—Cushman, Darby & Cushman

[57] ABSTRACT

The surgical microscope comprises a stand, an arm movably attached to said stand for sustaining a microscope body, an electric control equipment divided into a plural number of units removably piled up on said stand and a foot switch unit to be used for executing various types of functions. Accommodated in each unit are a function control means having a single specific function or plural specific functions different from those of the other units and an independent power source means connected to said function control means in a relation of 1:1 or in a different combination. The surgical microscope can be designed compact as a whole, has high operability and assures high security during operation. Should a function be lost due to troubles during operation, the surgical microscope prevents the other functions from being influenced by the troubles and allows to speedily restore the lost function.

11 Claims, 35 Drawing Sheets

| MONITOR ITEM | | | | | | | | | | MONITOR STANDARD |
|---|---|---|---|---|---|---|---|---|---|---|
| POWER SOURCE VOLTAGE | 1 | 1 | 1 | 1 | 1 | 1 | 1 | 1 | 0 | 1 — NORMAL<br>0 — ABNORMAL |
| MOTOR VOLTAGE | 0 | 1 | 1 | 0 | 0 | 1 | 1 | 0 | X | 1 — NORMAL<br>0 — ABNORMAL |
| MOTOR CURRENT | 0 | 1 | 1 | 0 | 1 | 0 | 0 | 1 | X | 1 — YES<br>0 — NO |
| JUDGED OUTPUT | A | B | C | D | E | F | G | H | I | |

| MONITOR ITEM | | | | | | MONITOR STANDARD |
|---|---|---|---|---|---|---|
| POWER SOURCE | 1 | 1 | 1 | 1 | 0 | 1 — NORMAL<br>0 — ABNORMAL |
| LAMP VOLTAGE | 1 | 0 | 1 | 0 | X | 1 — NORMAL<br>0 — ABNORMAL |
| LAMP CURRENT | 1 | 1 | 0 | 0 | X | 1 — YES<br>0 — NO |
| JUDGED OUTPUT | a | b | c | d | e | |

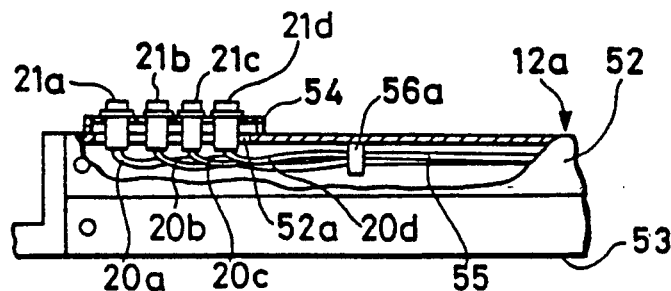
FIG. 20A
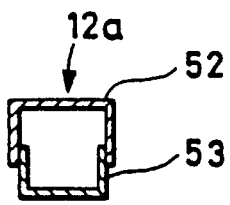
FIG. 20B
FIG. 21
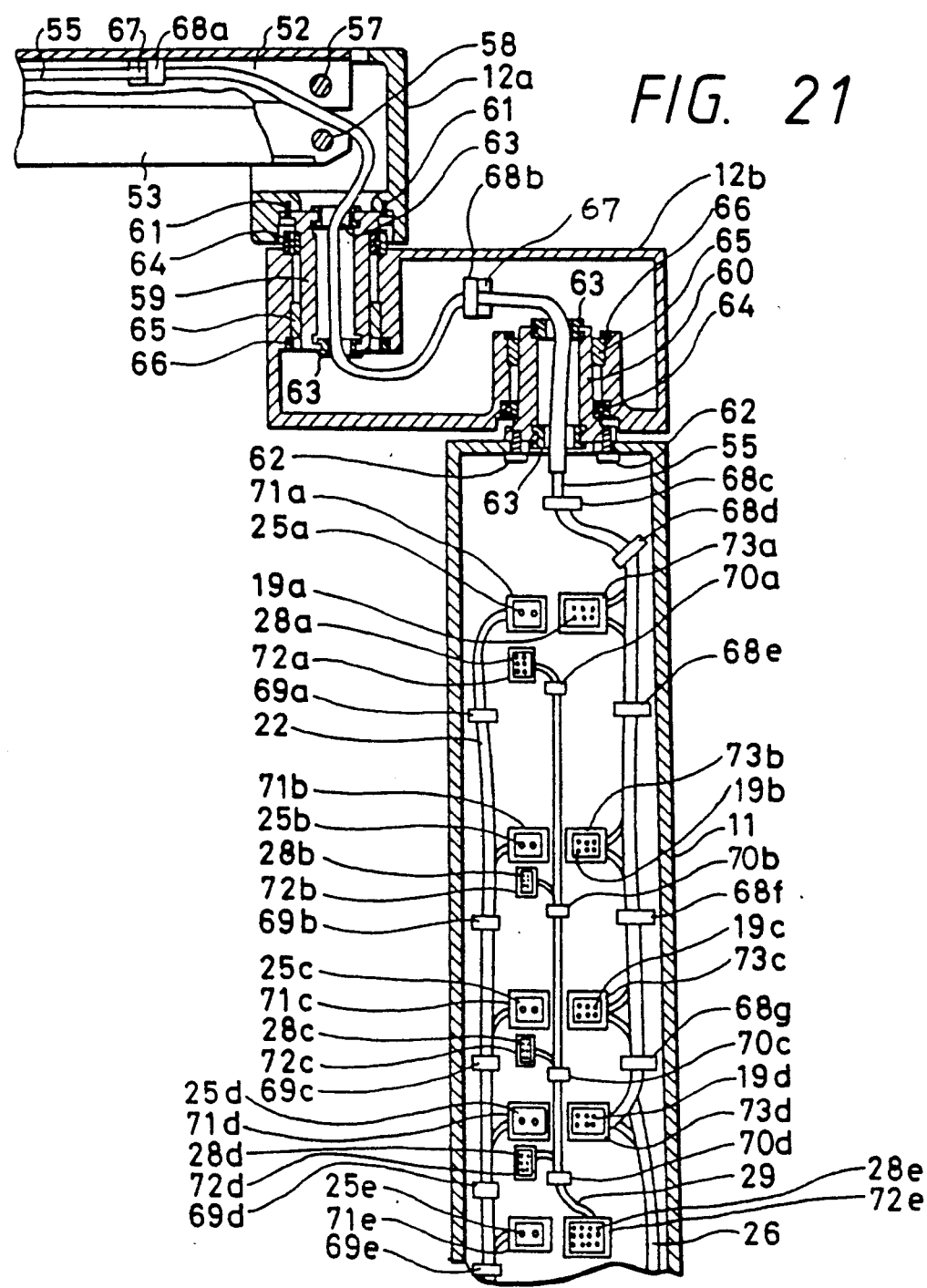

SURGICAL MISCROSCOPE WITH A MODULAR STAND

BACKGROUND OF THE INVENTION a) Field of the Invention

The present invention relates to a microscope, and more specifically to a surgical microscope comprising a stand, an arm attached to the stand for sustaining the surgical microscope at the tip thereof and an electric equipment.

b) Description of the Prior Art

Medical instruments such as surgical microscopes must have reliability and security due to the nature inherent therein. Speaking concretely, the medical instruments of this type must be rarely troubled, and, should a function be troubled, cause no influence on the other functions and be repairable easily and in a short time.

FIG. 1 illustrates an example of the electric equipment of the conventionally known surgical microscopes. The electric equipment consists of a motor-driven magnification adjustment means 1 for changing magnification of the microscope, a motor-driven focusing means 2 for focusing the microscope, a lamp means 3 for illuminating with lamps, a control means 4 for performing motor controls of the magnification adjustment means 1 and the focusing means 2 as well as brightness control and ON/OFF control of the lamp means 3, and a power source means 5 for supplying electric power to said control means 4. The power source means 5 is generally so adapted as to receive electric power from a commerical line power source 6, convert the power into control voltages and driving voltages for the motors and lamps, and then supply the voltages to the control means 4. Further, signals and powers from the control means 4 to the magnification adjustment means 1, the focusing means 2 and the lamp means 3 are supplied through connectors arranged on the tip of an arm (not shown) sustaining the microscope.

Let us now assume that a magnification adjustment motor arranged in the magnification adjustment means is locked and an overcurrent flows to the circuit. Though the circuit and parts are normally protected with protectors such as fuses, the power source means 5 is troubled in the worst case. Under such a circumstance, electric power is not supplied to the control means 4 from the power source means 5 and the entire electric equipment stops functioning. Speaking concretely, not only the magnification adjustment means 1 but also the focusing means 2 does not operate and the lamp means 3 is extinguished. Since most of the functions of the surgical microscope are now electrically operated, surgical operation is influenced rather seriously by the stopping of all the functions of the electric equipment and may not be continued in certain cases. Especially, the illumination with the lamps is indispensable for surgical operation and extinguishment of the lamp means may cause vital result. In addition, in the configuration shown in FIG. 1, the control means 4 must receive three to six voltages at different levels, thereby requiring the power source means 5 having large dimensions. Further, since the control means 4 is generally integrated with the power source means 5 for practical instrumentation in such a configuration, the power source means has larger dimensions. Accordingly, the power source means 5 cannot be repaired or restored speedily in case of a trouble occurring therein since troubleshooting in such a large power source means requires time-consuming checks in a broad range or replacement of such large power source means as a whole with a new one requires tough works.

In the recent years where ME (medical electronics) has made a great progress and different medical sections use the ME instruments unique thereto, the power sources for these instruments and connecting cables therefor are scattered around the site of surgical operation, thereby causing great hindrance on working convenience of surgical operators and assistants. It is desirable to build the power source means for the various component units into a surgical microscope and supply electric powers to the component units through connectors arranged at the tip of the arm, like the connectors attached to the tip of the arm for an auxiliary illuminator of the conventional surgical microscopes. Such a design will serve for making tidy the site of surgical operation by eliminating the power sources and connecting cables which are currently scattered around the site of surgical operation.

When it is assumed that each medical section uses two to five types of medical instruments most of which are unique thereto, there are placed a large number of medical instruments at a site of surgical operation. Accordingly, a surgical microscope designed on the basis of the configuration of the conventional surgical microscope and for use common to different medical sections must inevitably be equipped with more than ten power sources and more than ten connectors, thereby posing a problem that the surgical microscope will inevitably have large dimensions. Further, the connecting cable will inevitably be thickened, thereby posing another problem that the arm comprising such a connecting cable will have low operability.

SUMMARY OF THE INVENTION

A primary object of the present invention is to provide a surgical microscope having high security during operation and permits speedy repair of troubled functions.

Another object of the present invention is to provide a surgical microscope compactly composable as a whole and having excellent operability.

According to the present invention, these objects are accomplished by composing an electric equipment of a plural number of units removably arranged in a stand, and by equipping each of the units with a function control means having a specific single function or a plural number of functions and an independent power source means.

The surgical microscope according to the present invention prevents, should a unit be troubled, influence from being imposed on the other units, permits continuation of surgical operation with a single unit kept in a troubled condition, enables troubleshooting in a short time and only within a narrow range, allows to repair a troubled function easily by replacement of a troubled unit, modification and addition of functions, requires a small number of units for each surgical operation and uses a thin connecting cable.

In a preferred formation of the present invention, the individual units are so adapted as to be connected to a commercial line power source through subswitches attached to the individual units and a main switch connected to the subswitches in common. Further, each of the function control means is electrically connected to a driving source therefor arranged in the microscope body through a connector or connectors arranged on at least either of the tip of the arm or each unit.

In another formation of the present invention, all the units including the function control means and/or the power source means are arranged in the stand in such a manner that they can be removed and piled.

The surgical microscope according to the present invention is equipped with a self-diagnosis means having indication means for displaying operating conditions of the power source means and control means of the individual units as well as at least one spare unit connectable to the commercial line power source through the main switch.

These and other objects as well as the features and the advantages of the present invention will become apparent from the following detailed description of the preferred embodiments when taken in conjunction with the accompanying drawings.

BRIEF DESCRIPTION OF THE DRAWINGS

FIG. 20A and FIG. 20B are a partially broken side view and a cross sectional view respectively illustrating the tip of the long arm used in the Embodiment 1;

FIG. 21 is a sectional view illustrating internal cabling from the rear end of the long arm through an intermediate arm to the top of the stand used in the Embodiment 1;

FIG. 26A and FIG. 26B are block diagrams illustrating internal configurations of a strobe for camera and photographing unit respectively to be used in the Embodiment 1;

DESCRIPTION OF THE PREFERRED EMBODIMENTS

Now, the present invention will be described detailedly below with reference to the preferred embodiments shown in the accompanying drawings.

Figure 1:
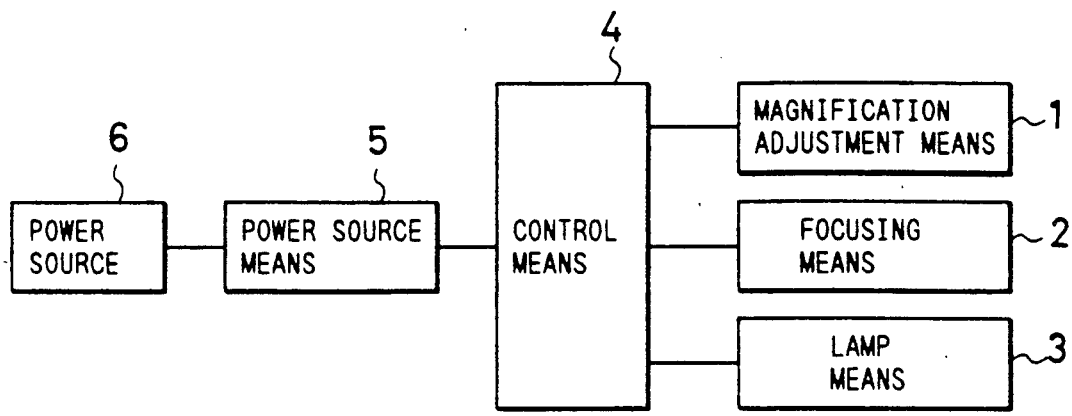
FIG. 1 is a block diagram showing an example of the conventional configurations of the electric equipment for the surgical microscopes.
Figure 2:
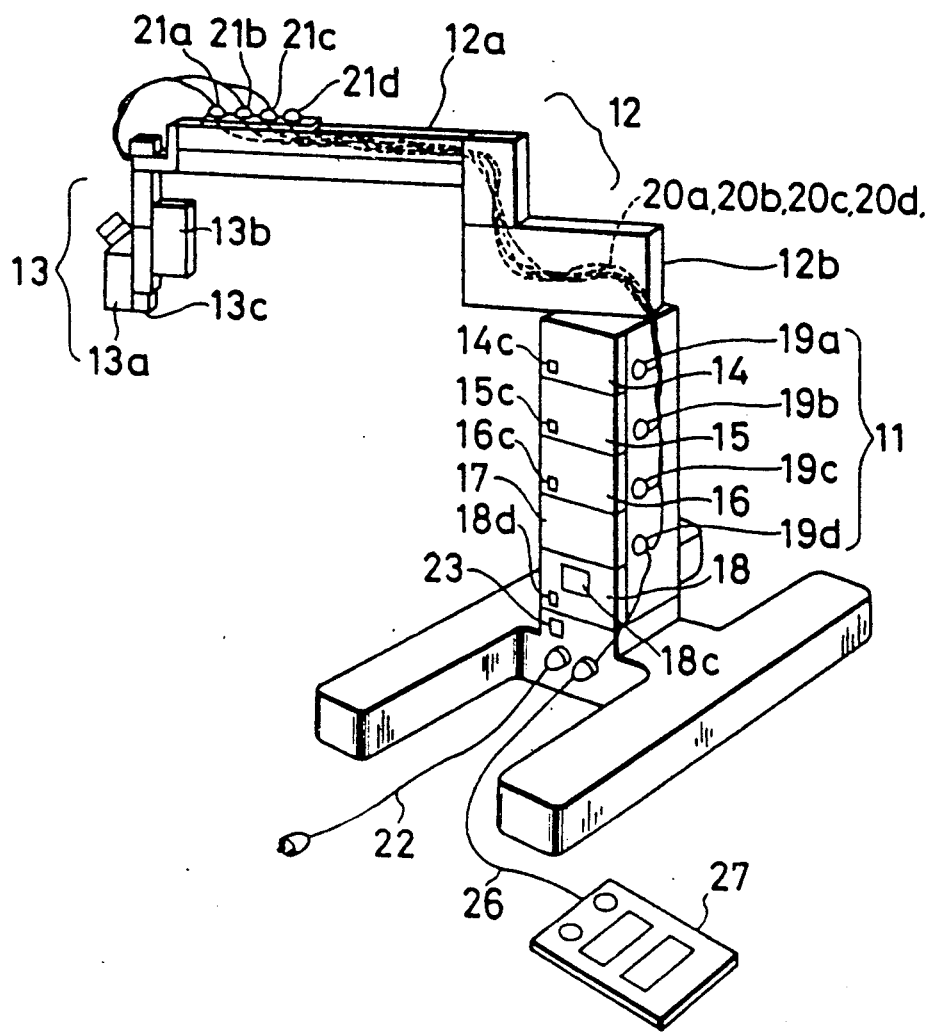
FIG. 2 is a perspective view illustrating Embodiment 1 of the surgical microscope according to the present invention.
Figure 3:
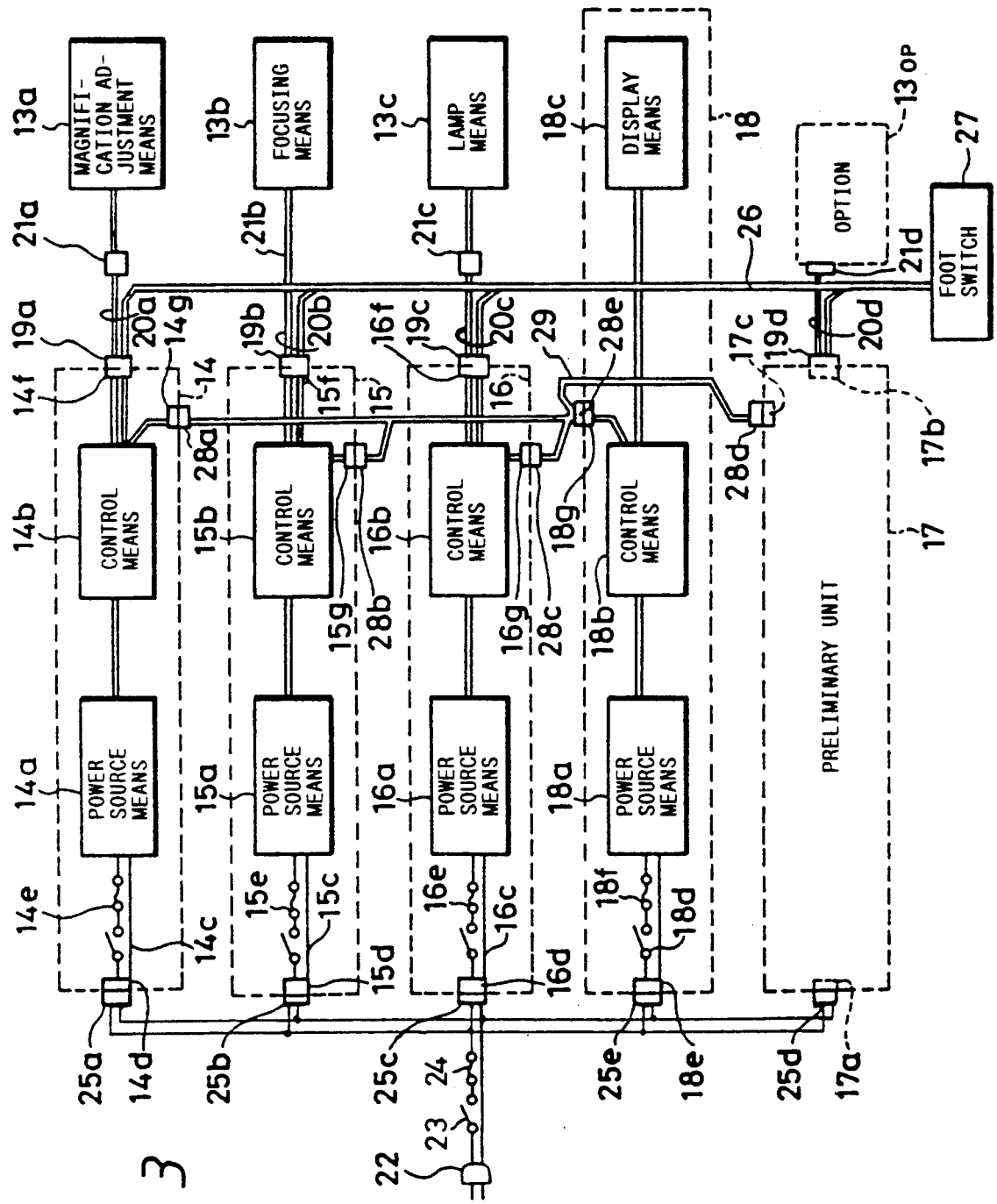
FIG. 3 is a block diagram illustrating the electric equipment for an Embodiment 1 of the present invention.
Figure 4:
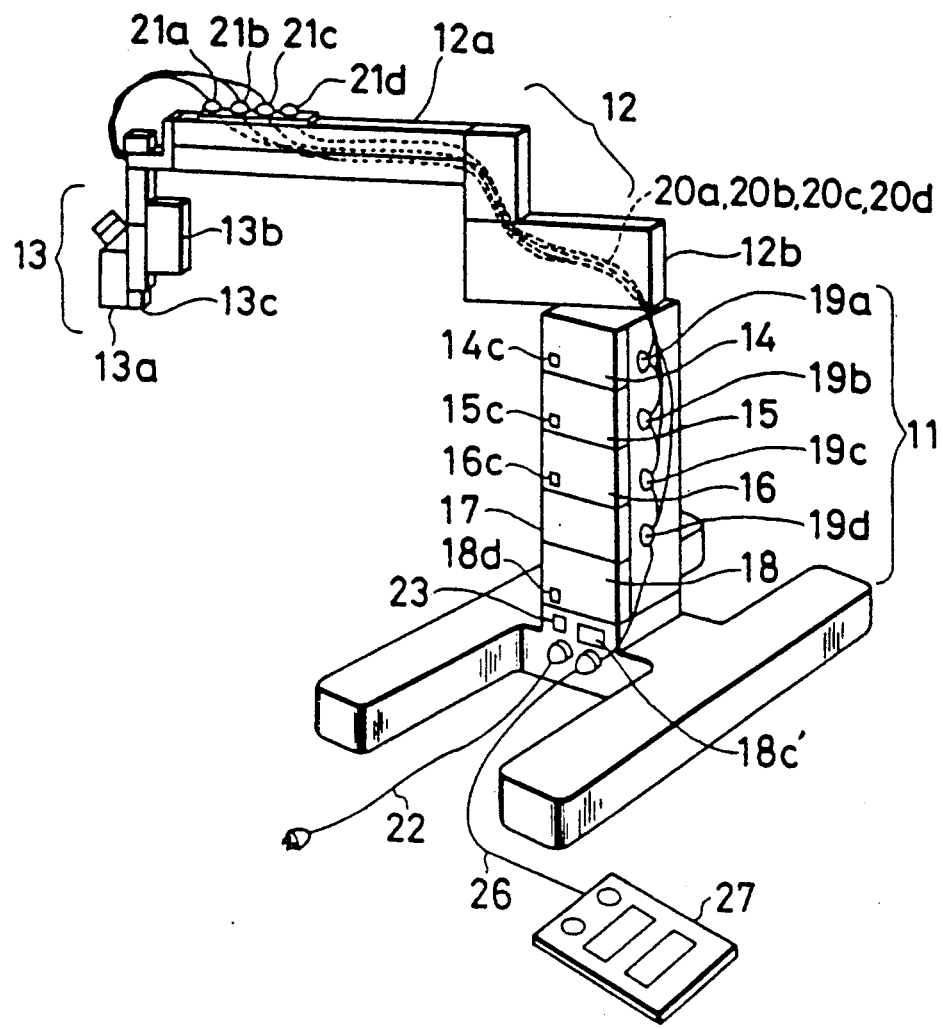
FIG. 4 and FIG. 5 are a perspective view illustrating a modification of the Embodiment 1 and a partially broken side view illustrating the main members thereof respectively.
Figure 5:
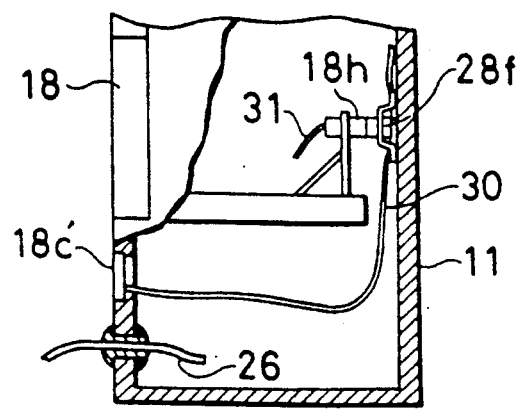

FIG. 2 shows the Embodiment 1 of the present invention. In this drawing, the reference numeral 11 represents a stand, the reference numeral 12 designates an arm which is attached to the stand 11 and has a tip movable in three dimensions. Speaking concretely, the arm 12 consists of a long arm 12a movable in the vertical direction and rotatable in the horizontal direction, and an intermediate arm 12b rotatable in the horizontal direction as disclosed by U.S. Pat. No. 4,523,732. The reference numeral 13 represents a microscope body which is sustained by the tip of the arm 12 in such a manner as to be rotatable in the horizontal direction, and has a magnification adjustment means 13a, a focusing means 13b and a lamp means 13c. The reference numerals 14, 15, 16, 17 and 18 designate an electric magnification adjustment unit, an electric focusing unit, a lamp illumination unit, a spare unit and self-diagnosis unit which are detachably attached to the stand 11 with screws respectively. Out of these units, the electric magnification adjustment unit 14, the electric focusing unit 15 and the lamp illumination unit 16 are composed of a power source means 14a, 15a and 16a and control means 14b, 15b and 16b respectively as illustrated in the circuit diagram presented in FIG. 3, connected to the magnification adjustment means 13a, the focusing means 13b and the lamp means 13c respectively through connectors having the known structure 19a, 19b and 19c as well as internal cables 20a, 20b and 20c connected thereto and connectors 21a, 21b and 21c which have the known structure, are arranged on the tip of the arm 12 and connected to the internal cables respectively as illustrated in FIG. 2, and further connected to a main switch to be described later through subswitches 14c, 15c and 16c respectively. Further, the spare unit 17 contains nothing as illustrated in the block diagram presented as FIG. 3, and, as shown in FIG. 2, within the stand is provided a connector 19d connected to a connector 21d for an option arranged on the tip of the arm 12 (and can be connected to an option 13op if required)

through an internal cable 20d, and a connector 25 is adapted to connect to the main switch to be described later. Furthermore, the self-diagnosis unit 18 consists of a power source means 18a, a control means 18b and a indication means 18c as illustrated in the block diagram presented as FIG. 3 so that the control means 18b monitors the control means 14b, 15b and 16b of the other units, allows the indication means 18c to display data on the other units and is connected to the main switch to be described later through a subswitch 18d. Usable as the power source means 14a, 15a, 16a and 18a of the units described above are various types of power source means such as transformers, switching power sources, batteries and power sources having primary sides insulated from the secondary sides. The reference numeral 22 represents a power cable connected to connectors 25a, 25b, 25c, 25d and 25e through an overcurrent protector 24 such as a main switch 23 or a fuse. Connected to these connectors 25a, 25b, 25c, 25d and 25e are connectors 14d, 15d, 16d, 17d and 18e of the electric magnification adjustment unit 14, the electric focusing unit 15, the lamp illumination unit 16, the spare unit 17 and the self-diagnosis unit 18 respectively. The connectors 14d, 15d, 16d and 18e are connected to the power source means 14a, 15a, 16a and 18a through the subswitches 14c, 15c, 16c and 18d of the units 14, 15, 16 and 18 as well as overcurrent protectors 14e, 15e, 16e and 18f such as fuses, and the power source means 14a, 15a, 16a and 18a are further connected to the control means 14b, 15b, 16b and 18b respectively. The overcurrent protector 24 has a capacity larger than that of the overcurrent protector 14e, 15e, 16e or 18f of each unit so that the overcurrent protector 24 will not operate earlier than the latter protectors. The control means 14b, 15b and 16b are connected to connectors 14f, 15f and 16f as well as connectors 14g, 15g and 16g, whereas the control means 18b is connected to a connector 18g and the indication means 18c. In addition, arranged on the spare unit 17 are additional connectors 17b and 17c. The connectors 14f, 15f, 16f and 17b are connected to connectors 19a, 19b, 19c and 19d respectively, which are connected to cables 20a, 20b, 20c, 20d and a common cord 26, respectively, and further the common cord 26 is connected to a foot switch unit 27. Further, the connectors 14g, 15g, 16g and 17c are connected to connectors 28a, 28b, 28c and 28d respectively, which are connected to one another through a connector 28e connected to the connector 18g on the self-diagnosis unit and a common cord 29. In addition, it is possible to install an indication means 18c' on the stand 11, and connect the indication means to the control means 18b through a cord 30, a connector 28f, a connector 18h and a cord 31 as shown in FIG. 5.

Figure 6A:
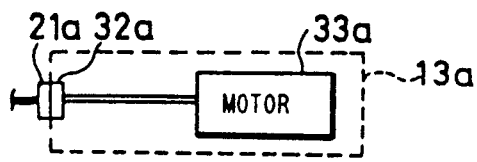
FIG. 6A, FIG. 6B and FIG. 6C are block diagrams illustrating internal configurations of the magnification adjustment means, focusing means and lamp means respectively of the Embodiment 1.
Figure 6B:
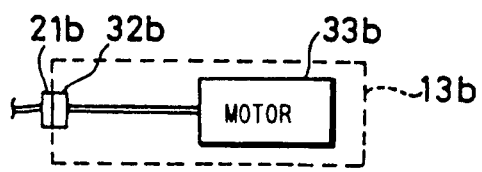
Figure 6C:
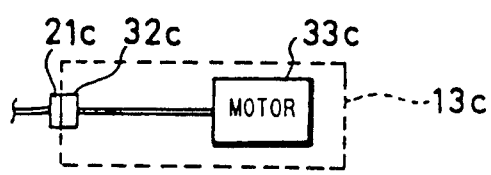

Internal configuration of the magnification adjustment means 13a is illustrated in the block diagram presented as FIG. 6A. The magnification adjustment means 13a consists of a connector 32a connectable to a connector 21a and a lens driving motor 33a connected to the connector 32a. FIG. 6B shows internal configuration of the focusing means 13b in a form of a block diagram wherein the focusing means 13b consists of a connector 32b connectable to a connector 21b and a microscope tube driving motor 33b connected to the connector 32b. FIG. 6c illustrates internal configuration of the lamp means 13c in a form of a block diagram wherein the lamp means 13c consists of a connector 32c connectable to a connector 21c and a lamp 33c connected to the connector 33c.

Figures 7A, 7B, 7C:
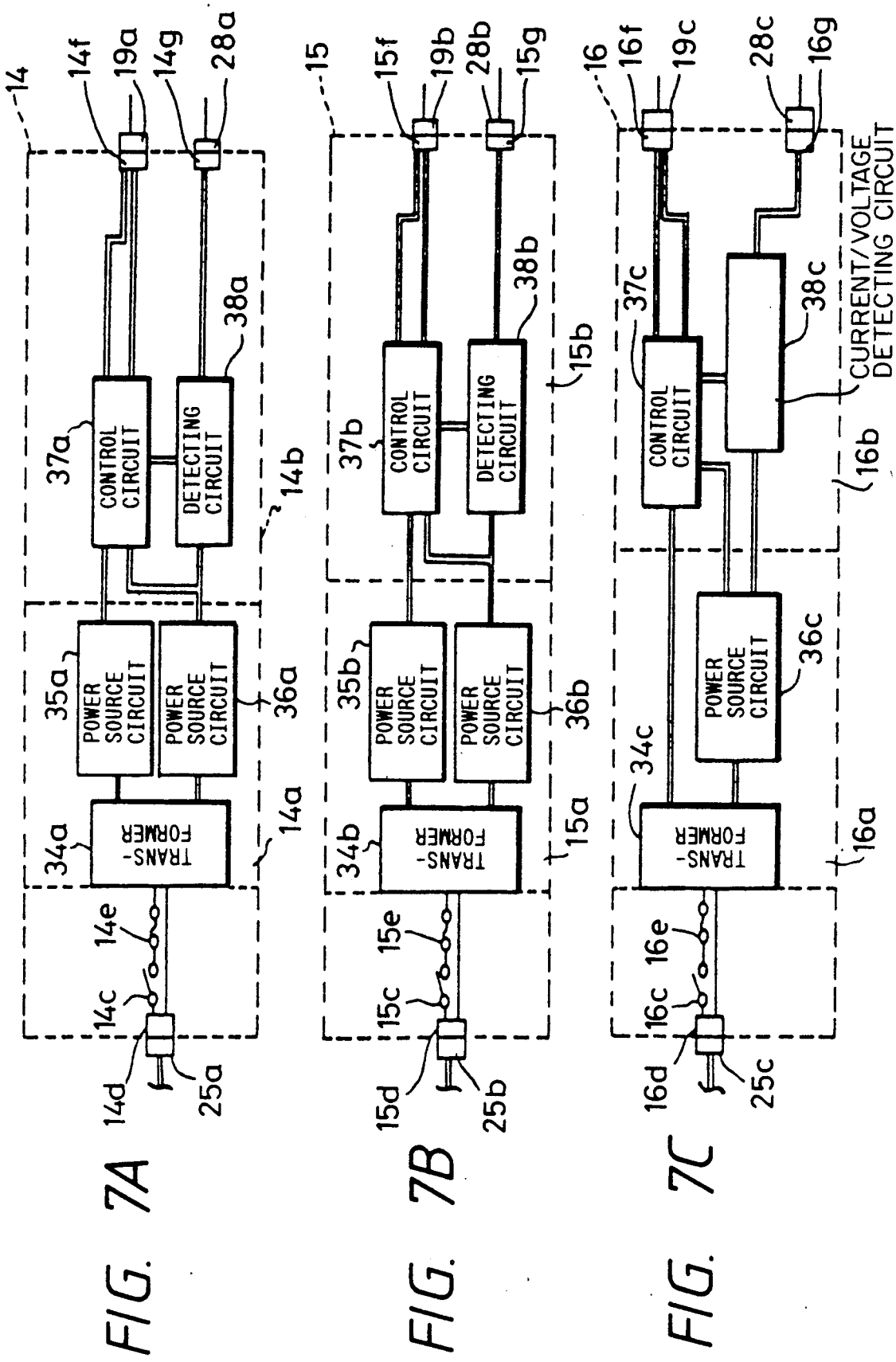
FIG. 7A, FIG. 7B and FIG. 7C are block diagrams illustrating internal configurations of the electric magnification adjustment unit, electric focusing unit and lamp illumination unit respectively of the Embodiment 1.

FIG. 7A shows a block diagram illustrating internal configuration of the electric magnification adjustment unit 14 wherein the power source means 14a comprises a transformer 34a which is connected to the overcurrent protector 14e and serves for insulation and voltage transformation, a motor drive power source circuit 35a which is connected to an output terminal of the transformer 34a and prepares DC power for driving a motor, and a control power source circuit 36a which is also connected to the output terminal of the transformer 34a and prepares AC power for control. Further, the control means 14b comprises a motor control circuit 37a for controlling the voltage to be applied to the motor 33a through the connector 14f, etc. with the outputs supplied from the motor drive power source circuit 35a and the control power source circuit 36a, and a current-/voltage detecting circuit 38a which is connected to the output terminal of the control power source circuit 36a and provides data on the motor control circuit 37a to the self-diagnosis unit 18 through the connector 14g, etc. while detecting the motor driving current/voltage flowing through the motor control circuit 37a. FIG. 7B shows a block diagram illustrating internal configuration of the electric focusing unit wherein the power source means 15a which is connected to the connector 15d through the subswitch 15c and the overcurrent protector 15e comprises a transformer 34b performing the functions similar to those of the circuit arranged in the power source means 14a, a motor drive power source circuit 35b and a control power source circuit 36b. The control means 15b is equipped with a motor control circuit 37b performing the functions similar to those of the circuits arranged in the control means 16b and a current/voltage detecting circuit 38b. The motor 33b (FIG. 6B) is controlled by the output provided from the motor control circuit 37b through the connector 15f, etc., and data on the motor driving current is provided from the current/voltage detecting circuit 38b to the self-diagnosis unit 18 through the connector 15g, etc. FIG. 7C shows a block diagram illustrating internal configuration of the lamp illumination unit 16 wherein the power source means 16a comprises a transformer 34c which is connected to the overcurrent protector 16e and performing insulation and voltage transformation, and a control power source circuit 36c which is connected to the output terminal of the transformer 34c and prepares DC power for control. Further, the control means 16b consists of a lamp voltage control circuit 37c for controlling the voltage to be applied to the lamp 33c through the connector 16f with the outputs provided from the transformer 34c and the control power source circuit 36c, and a current/voltage detecting circuit 38c which is connected to the output terminal of the control power source circuit 36c and provides data on the lamp voltage control circuit 37c to the self-diagnosis unit 18 through the connector 16g, etc. while detecting the lamp ignition current/voltage flowing through the lamp voltage control circuit 37c.

Figure 8:
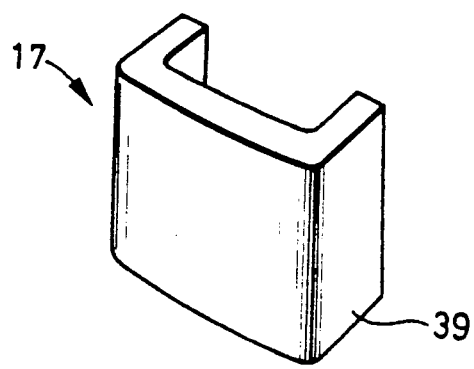
FIG. 8 is a perspective view illustrating the spare unit of the Embodiment 1.

FIG. 8 illustrates a spare unit which consists only of a cover 39.

Figure 9A:
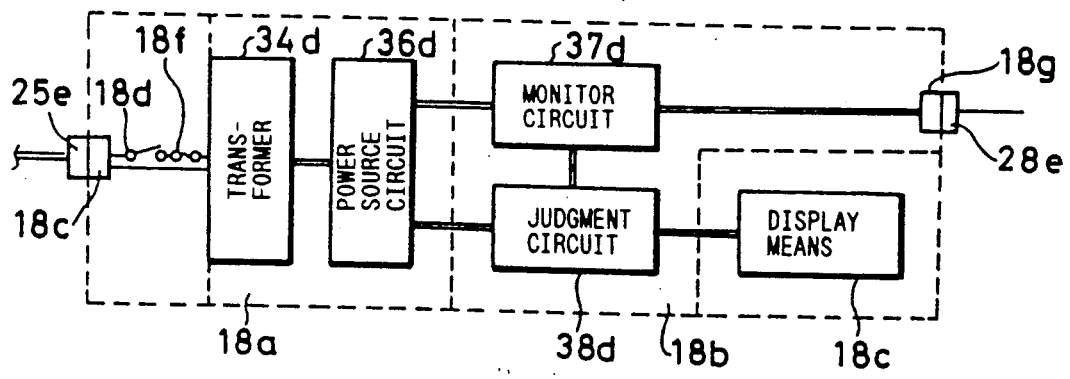
FIG. 9A and FIG. 9B are block diagrams illustrating internal configurations of the self diagnosis unit used in the Embodiment 1 and a modification example of the power source means therefor.
Figure 9B:
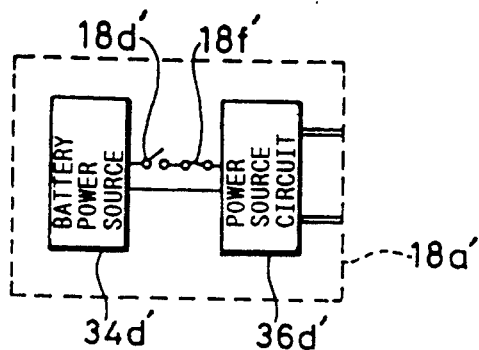

FIG. 9A is a block diagram illustrating internal configuration of the self-diagnosis unit 18 wherein the power source means 18a consists of a transformer 34d which is connected to the overcurrent protector 18f and performs insulation and voltage transformation, and a power source circuit 36d which is connected to the output terminal of the transformer 34d and prepares two DC powers. Further, the control means 18b comprises a current/voltage monitor circuit 37d which is connected to either of the output terminals of the power source circuit 36d, and monitors currents and voltages in the other units through the connector 18g, etc. by using signals provided from the current/voltage detecting circuits of the other units, and a diagnosis circuit 38d which is connected to the other output terminal of the power source circuit 36d, judges troubles and normal conditions in the individual units by using signals provided from the current/voltage monitor circuit 37d, and allows the indication means to display judged results. In addition, it is possible to replace the power source means 18a with another power source means 18a' composed, as exemplified by FIG. 9B, of a battery power source 34d' and a power source circuit 36d' connected to said battery power source 34d' through a subswitch 18d' and an overcurrent protector 18f', and it is unnecessary in this case to connect the power source means to the connector 25e. Now, description will be made on the operations for self diagnosis to be performed by the self-diagnosis unit 18, which are similar to those disclosed by Japanese Preliminary Patent Publication Sho. 19318/64.

Figures 10, 11, 12:
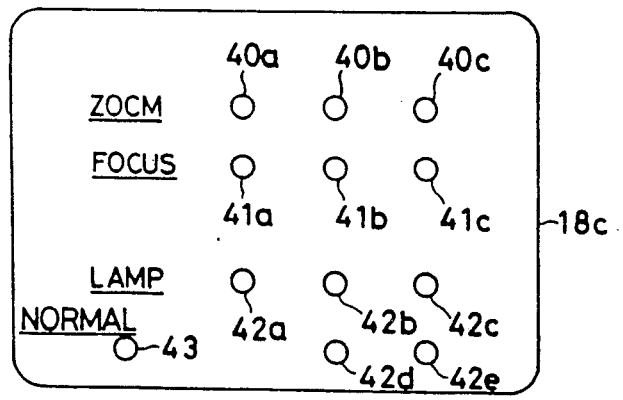
FIG. 10 and FIG. 11 are tables exemplifying contents of the logical calculations for the electric magnification adjustment (focusing) unit and the lamp illumination unit respectively in the Embodiment 1.
FIG. 12 is a front view exemplifying displays arranged on the self diagnosis unit in the Embodiment 1.

FIG. 10 exemplifies logical calculations for the electric magnification adjustment (focusing) unit 14 (15), whereas FIG. 11 provides an example of the logical calculations for the lamp illumination unit 16. Speaking with reference to FIG. 10, judged output A or B indicates normal condition of unit 14 (15), C, D or E indicates abnormal condition in the motor control circuit 37a (37b), F indicates wire breakage in the motor 33a (33b), G indicates abnormal condition in the motor control circuit 37a (37b), H indicates shorting in the motor 33a (33b), and I indicates abnormal condition in the power source means 14a (15a). Further, in FIG. 11, judged result a indicates normal condition in the unit 16, b indicates shorting of the output, c indicates breakage of the lamp, d indicates trouble in the lamp voltage control circuit 37c, and e indicates trouble in the power source means 16a. Based on the judged outputs described above, troubles are displayed by the indication means 18c whose configuration is exemplified in FIG. 12 as it is composed of LED's.

In FIG. 12, arranged on the indication means 18c are LED's 40a through 42e and 43. Speaking of functions of these LED's 40a, 40b and 40c are used for displaying troubled locations in the electric magnification adjustment unit 14, the LED's, 41a, 41b and 41c are employed for displaying troubled locations in the electric focusing unit 15, the LED's 42a, 42b, 42c, 42d and 42e serve for displaying troubled locations in the illumination unit 16, and the LED 43 functions to indicate normal results of the initial diagnosis. The circuit is composed in such a manner that the LED 40a (41a) is lit when the judged result output from the self-diagnosis unit 18 of the electric magnification adjustment (focusing) unit 14 (15) is I (FIG. 10), the LED 40b (41b) is ignited when the judged result output is C, D, E or G, the LED 40c (41c) is lit when the judged result output if F or H, and no LED is lit when the judged result output is A or B. Further, the LED 42a is ignited when the judged result output from the self-diagnosis unit 18 of the illumination unit 16 is e (FIG. 11), the LED 42b is lit when the judged result output is d, the LED 42c is ignited when the judged result output is b or c, and no LED is ignited when the judged result output is a.

The circuitry described above is composed for the normal self diagnosis after the electric equipment is energized with electric power. The surgical microscope according to the present invention is also capable of performing self-diagnosis only of the illumination means prior to the normal diagnosis, for example, upon energizing of the surgical microscope, with a means including a troubleshooting means for initial diagnosis of the illumination unit 16 and the normal diagnosis which is described concretely below.

Figure 13:
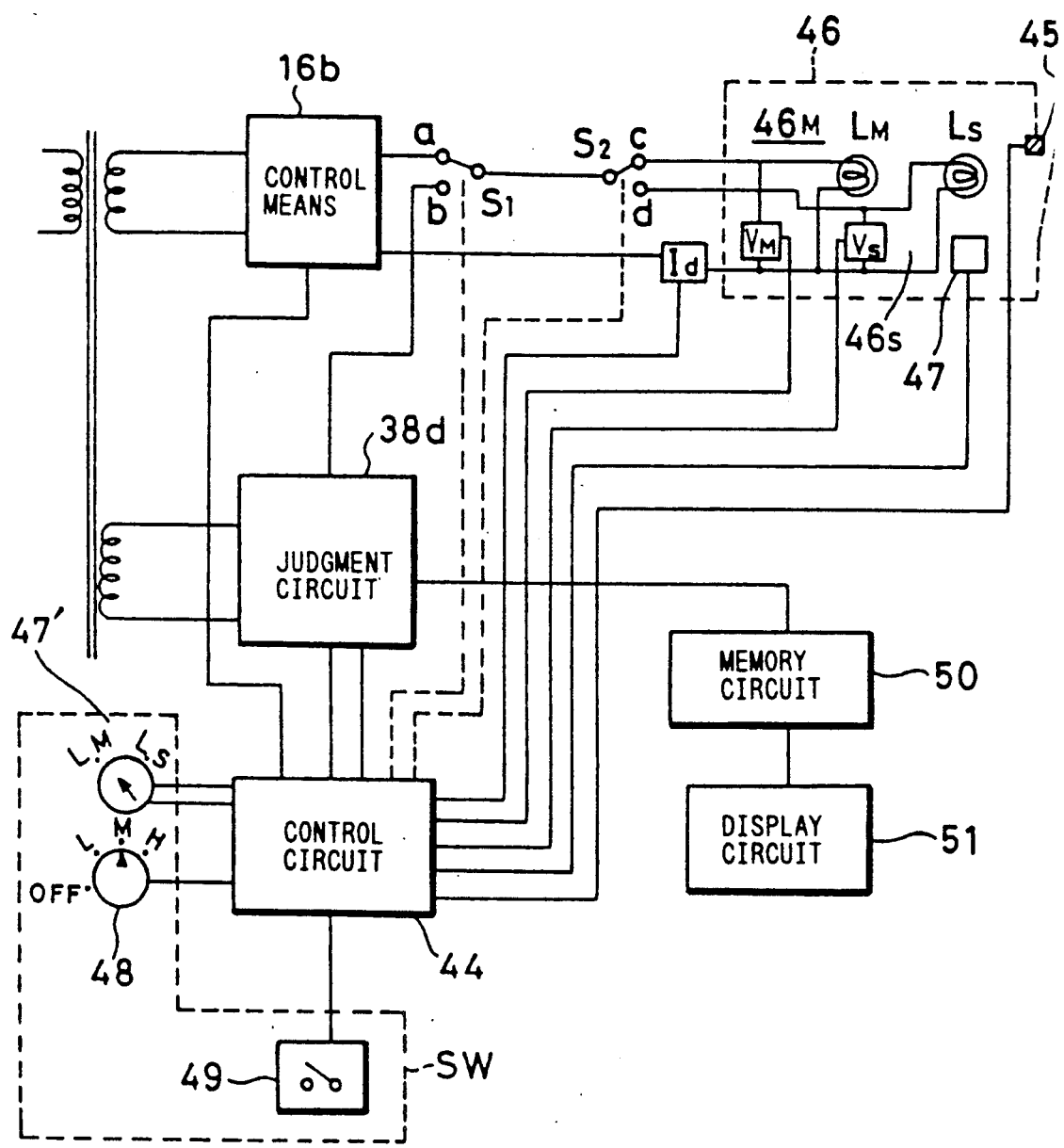
FIG. 13 is a circuit diagram illustrating an example of a troubleshooting means for performing initial diagnosis and troubleshooting of the lamp illumination unit in the Embodiment 1.

FIG. 13 exemplifies a circuit diagram of this means wherein the reference symbol $L_M$ represents a main lamp which is selected so as to be ignited for illumination, the reference symbol $L_S$ designates a spare lamp which is not selected for illumination, the reference symbols $V_M$ and $V_S$ denote voltage detectors connected between the terminals of the main lamp $L_M$ and the spare lamp $L_S$ respectively, and the reference symbol $I_d$ represents a current detector arranged on the terminal of the main lamp $L_M$ and the spare lamp $L_S$ which is connected to the control circuit 16b, these members being connected to a control circuit 44 and composing the current/voltage monitor circuit shown in FIG. 9A. The reference numeral 45 represents an opening/closing sensor for the cover of a lamp house 46 accommodating the main lamp $L_M$ and the spare lamp $L_S$, and in order to prevent malfunction due to chattering of the sensor, the troubleshooting means is so composed as to allow the microscope to operate only when it confirms that the cover is kept closed continuously for at least a definite time. The reference numeral 47 designates a temperature sensor for detecting temperature in the lamp house 46 and composing a temperature monitor circuit which flickers an alarm lamp (not shown) for providing an alarm signal to users when temperature in the lamp house 46 exceeds a preset level. The reference symbol $S_1$ denotes a selector switch for connection to a terminal a on the control means 16b or a terminal b on the diagnosis circuit 38d. A rated voltage/current for lamp ignition can be provided to the lamps $L_M$ or $L_S$ when the selector switch is connected to the terminal a, whereas a low current for the initial diagnosis can flow to the lamps $L_M$ or $L_S$. The current for the initial diagnosis is set at a low level for the purpose of preventing the lamps from being ignited during the initial diagnosis and since the lamps need not be ignited before operation of the surgical microscope. The reference symbol $S_2$ represents a selector switch for selective connection to the terminal c of the main lamp $L_M$ or the terminal d of the spare lamp $L_S$. Switching control of the selector switches $S_1$ and $S_2$ is performed by the control circuit 44. The reference symbol SW represents a remote control switch unit for controlling the main lamp $L_M$ and the spare lamp $L_S$ by way of the control circuit 44, the reference numeral 47 designates a selector switch for selecting a lamp to be made conductive for ignition and the initial diagnosis, the reference numeral 48 denotes light adjusting switch for adjusting the lamp selected by the selector switch 47′ (the main lamp $L_M$ in this case) even in the OFF condition thereof, and the reference numeral 49 represents a power switch for ON/OFF switching of the selected main lamp $L_M$. The switches 47, 48 and 49 are arranged in the remote control switch unit SW. The diagnosis circuit 38d judges the normal/abnormal conditions of the power source voltage, lamp voltage and lamp current inputted from the control circuit 44, for example, as listed in the logical calculation table shown in FIG. 11. The reference numeral 50 represents a memory circuit for storing the judged results and is reset by deenergizing the circuit or opening the lamp house 46. Judged results obtained with the diagnosis circuit 38d are displayed by the indication means 18c through an indication circuit 51.

Figure 14:
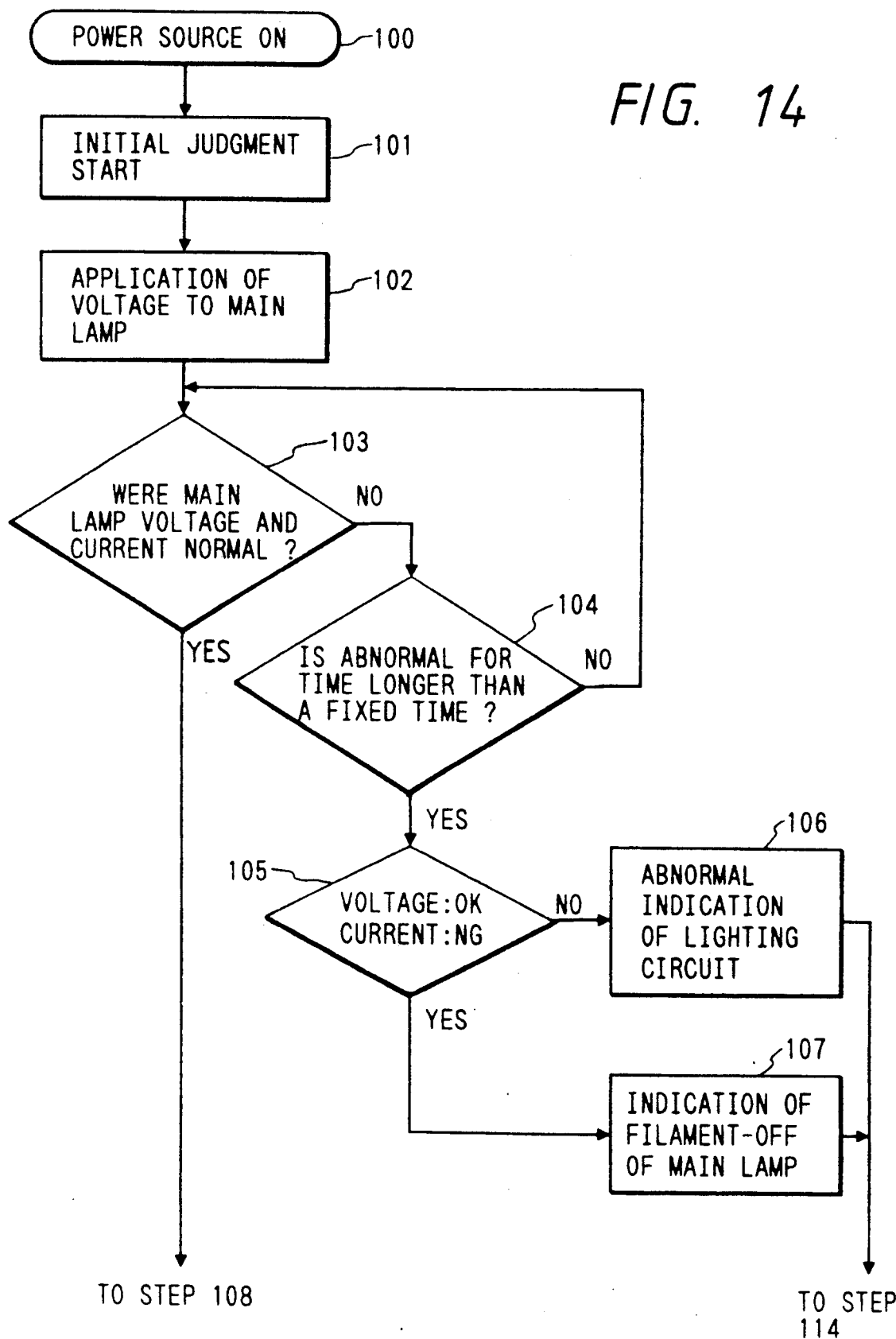
FIG. 14 through FIG. 17 are flow charts illustrating the procedures for diagnosis to be performed by the troubleshooting means.
Figure 15:
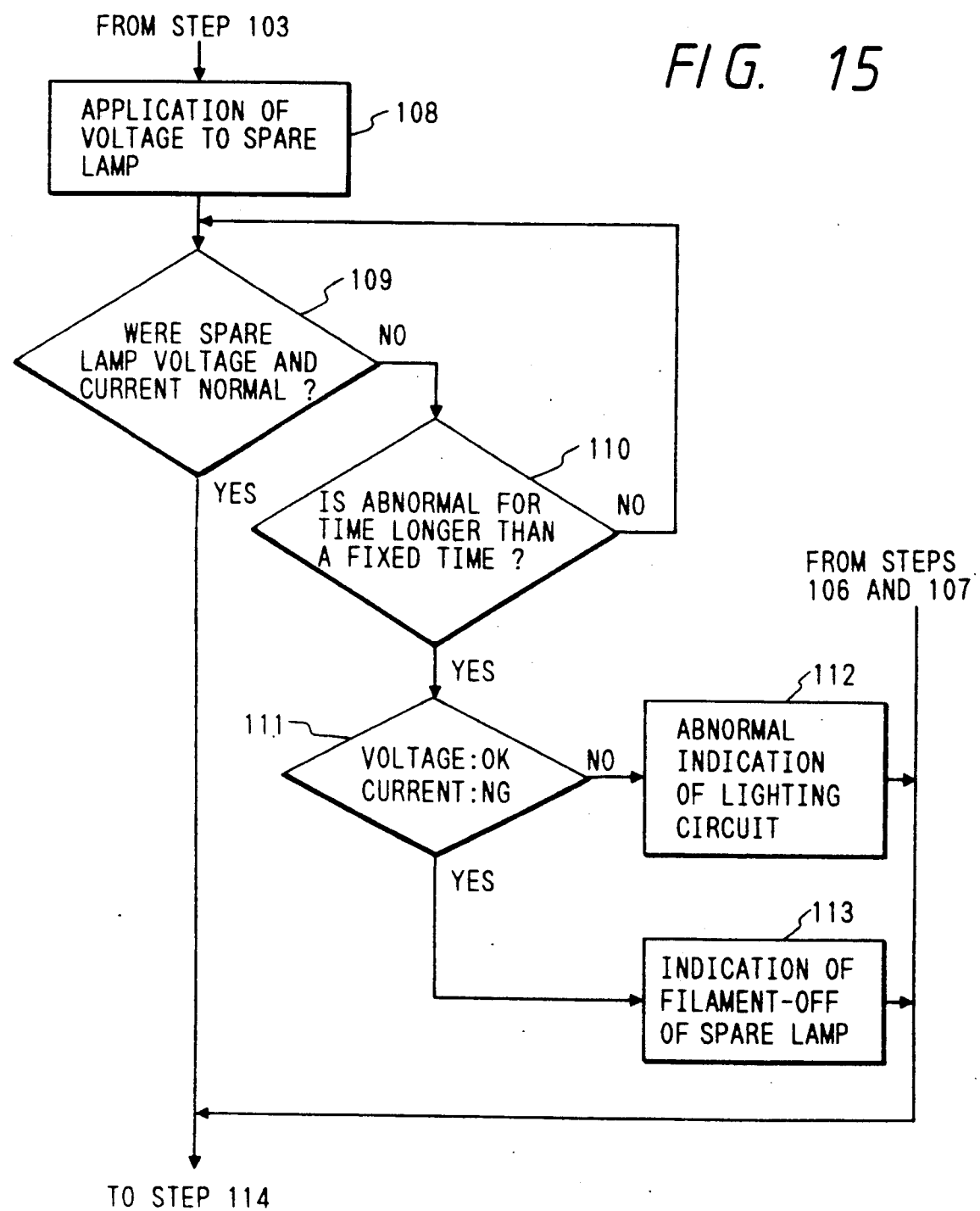
Figure 16:
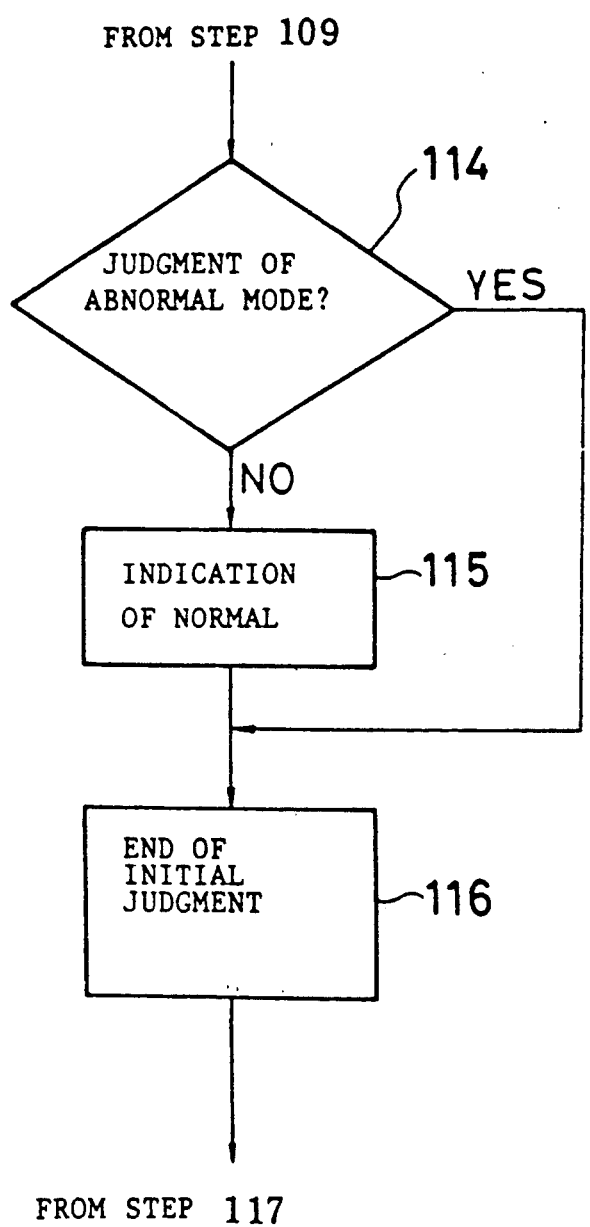
Figure 17:
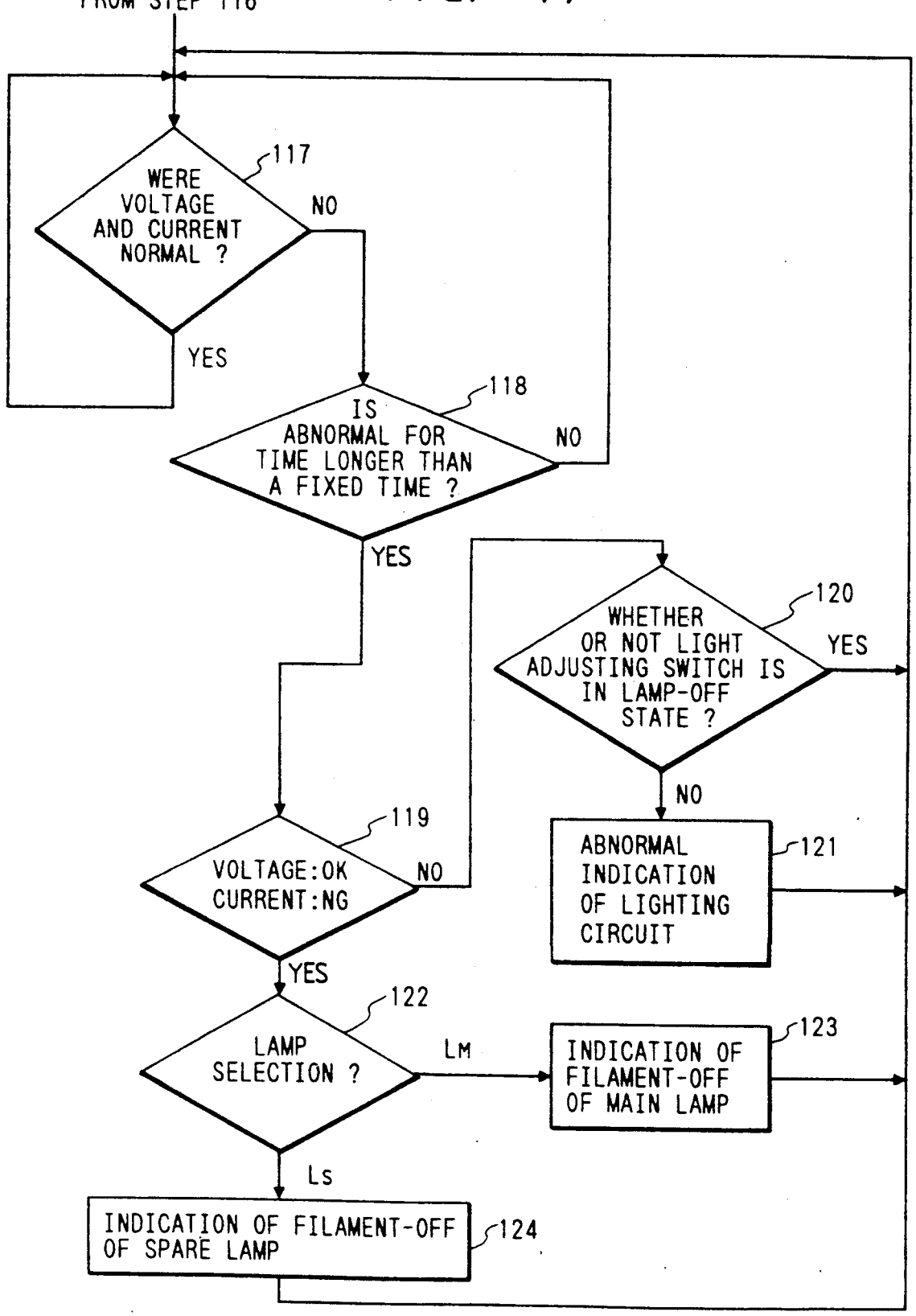
Figure 18:
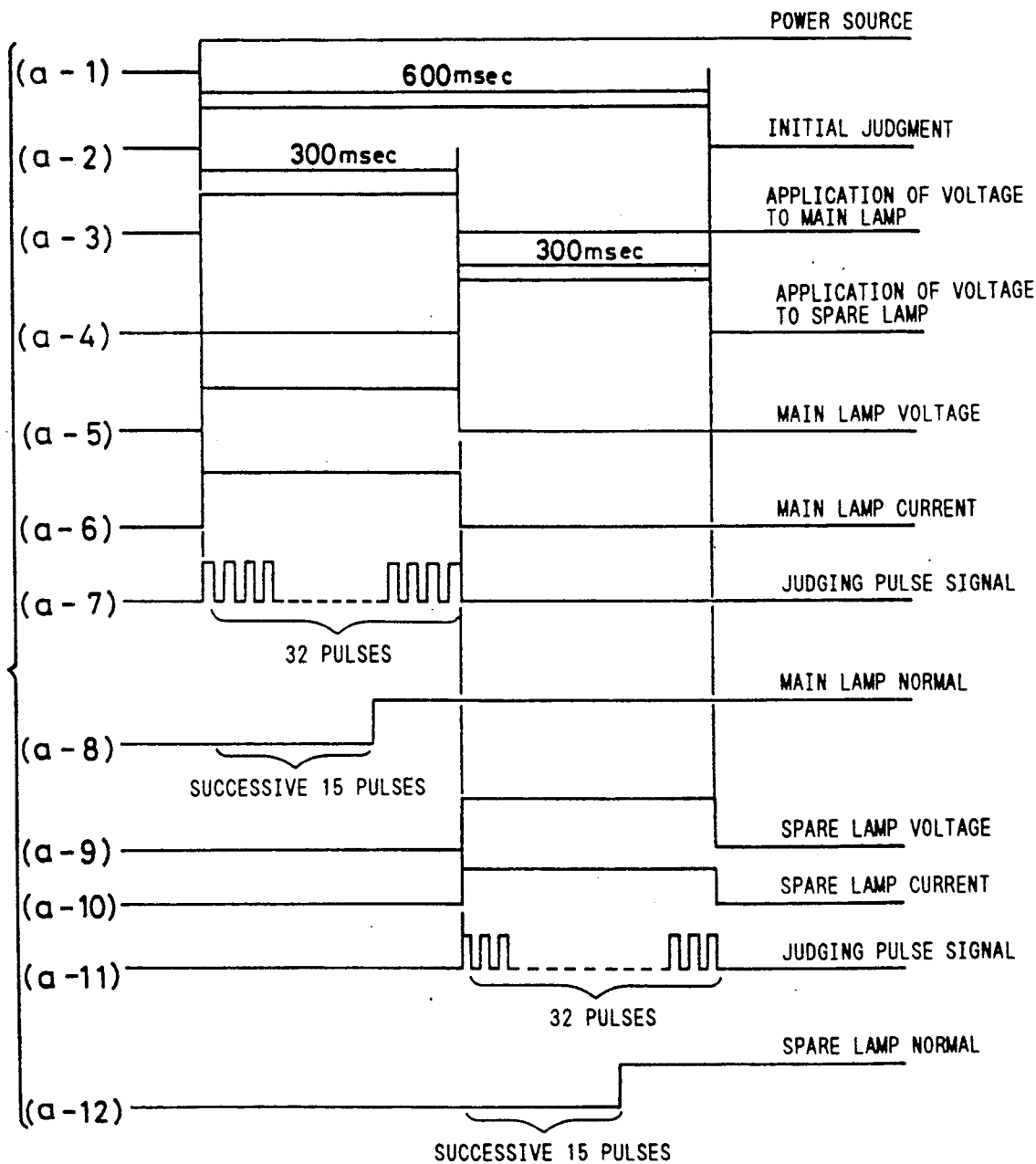
FIG. 18 and FIG. 19 are time charts of the initial diagnosis and normal diagnosis to be performed by the troubleshooting means.
Figure 19:
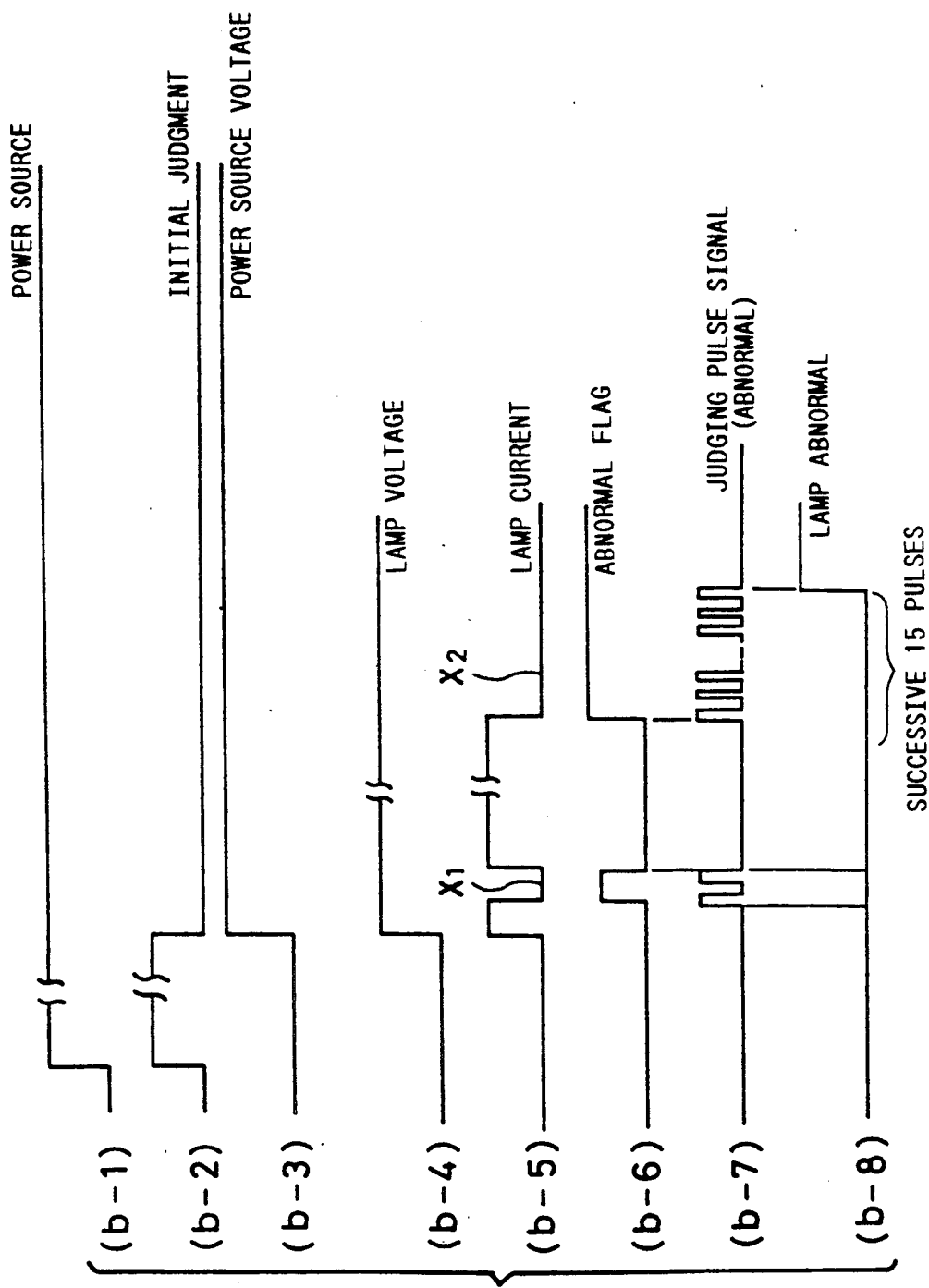

Now, functions of the above-described troubleshooting means will be explained below. First, diagnosis functions of the troubleshooting means will be described with reference to FIG. 14 through FIG. 19. When the power source means is turned ON at step 100 in FIG. 14, the control circuit 44 connects the selector switch $S_1$ to the terminal b and connects the selector switch $S_2$ to the terminal c on the main lamp $L_M$ before the control circuit 44 automatically starts the initial diagnosis (at step 101). When the diagnosis circuit 38d flows the low current to the main lamp $L_M$, the voltage detector $V_M$ and the current detector $I_d$ detects the voltage and the current respectively, and provides the voltage and the current in forms of pulse signals to the control circuit 44 to judge normal/abnormal condition of each output based on judged pulses inputted to the diagnosis circuit 38d in answer to the detection signals provided to the control circuit 44 from the diagnosis circuit 38d (step 103). When the voltage or current applied to the main lamp $L_M$ is abnormal temporarily for a time shorter than a preset time, no abnormality is judged and the program returns to step 103 (step 104). If the lamp voltage is judged as abnormal, an ignition circuit 46M (FIG. 13) is judged as abnormal at step 106 regardless of normal/abnormal condition of the lamp current, and the LED 42b is ignited on the indication means 18c. If only the lamp current is abnormal, breakage of the main lamp $L_M$ is judged at step 107, the LED 42c is ignited on the indication means 18c and the program proceeds to step 116 (FIG. 16) to complete the initial diagnosis. When the main lamp $L_M$ is judged as normal at step 103, the selector switch $S_2$ is connected to the terminal d for initial diagnosis of the spare lamp $L_S$ at step 108 as shown in FIG. 15 and the low current is flowed. Normal/abnormal conditions of the voltage and current for the spare lamp $L_S$ are judged in the manner similar to that for the initial diagnosis of the main lamp $L_M$. If an abnormal condition is detected, whether or not the abnormal condition is temporary is judged at step 111. If the lamp voltage is abnormal, the ignition circuit 46S is judged as abnormal (step 112) and the LED 42d is ignited on the indication means 18c. If only the lamp current is abnormal, breakage of the spare lamp $L_S$ is judged at step 113, the LED 42e is ignited on the indication means 18c and the program proceeds to step 116 to complete the initial diagnosis. When also the spare lamp $L_S$ is judged as normal at step 109, the LED 43 is ignited on the indication means 18c and the initial diagnosis is completed (step 116). Now, description will be made on the time chart illustrated in FIG. 18. When the initial diagnosis is started (a-2) upon energizing of the instrument (a-1), voltages and currents, for example on the order of 5 V and 5 mA respectively, are applied to the main lamp $L_M$ and the spare lamp $L_S$ respectively (a-3, a-4), and the pulses of the voltage and the current to be applied to the main lamp $L_M$ are kept at HIGH levels as indicated by (a-5) and (a-6) respectively while the voltage is being applied for the initial diagnosis. 32 judging pulse signals are applied to the diagnosis circuit 38d successively at intervals a little shorter than 10 ms (a-7). When the HIGH level of the lamp current (a-6), for example out of (a-5) and (a-6), is detected successively at least 15 times, the diagnosis circuit 18d judges the normal condition of the lamp current (a-8). When the current flowing to the main lamp $L_M$ is set at the LOW level while the lamp voltage is applied, the judged pulse signal is outputted and, if the signal is outputted successively for 15 times or more, it is judged that the lamp current is abnormal and the main lamp $L_M$ is broken. When the judged pulse signal indicating the LOW level is detected successively 14 times or less, the abnormality is regarded as temporary and no lamp current abnormality, etc. are detected. The troubleshooting means functions in the similar manner for the spare lamp $L_S$ as indicated by (a-9) through (a-12) in FIG. 18. Further, the troubleshooting means functions in quite the similar manner for the normal diagnoses other than the initial diagnosis. If an abnormal condition is detected by the initial diagnosis, the troubleshooting means energizes the surgical microscope after the defective part is repaired. The troubleshooting means is so adapted as to perform the initial diagnosis not only on energizing the microscope but also upon confirmation by the opening/closing sensor of the closing of the cover of the lamp house 46 after it is opened and upon detection by the temperature sensor of an internal temperature in the lamp house 46 exceeding a preset level, regardless of operating and rest conditions of the surgical microscope.

Now, description will be made on troubleshooting after completion of the initial diagnosis, i.e., functions for the normal diagnoses. For the normal diagnoses of the illumination means, the control circuit 44 connects the selector switch $S_1$ to the terminal a on the control means 16b and connects the selector switch $S_2$ to the terminal c on the main lamp $L_M$ upon completing the initial diagnosis. The power source voltage applied to the ignition circuit 46M is monitored by the voltage-/current detection circuit 38c arranged in the control means 16b. Further, normal/abnormal conditions of the voltage and current applied to the main lamp $L_M$ are judged at step 117 in the flow chart illustrated in FIG. 17. If either is abnormal, it is judged whether or not the abnormal condition has been kept for a time longer than a definite time at step 118. If the lamp voltage is abnormal, the ignition circuit 46M is judged as abnormal so long as the light adjusting switch 48 is not turned OFF (step 120), the LED 42b is ignited on the indication means 18c and the program returns to step 117. If only the lamp current is abnormal, the main lamp $L_M$ is judged as broken and the LED 42c is ignited on the indication means 18c (step 123), but when the selector switch $S_2$ is connected to the terminal d on the spare lamp $L_S$, the LED's 42d and 42e are ignited on the indication means 18c (steps 121 and 124). Further, when the lamp voltage and current are normal at step 117, the normal diagnosis is continued. In the time chart shown in FIG. 19 which is similar to that illustrated in FIG. 18, the lamp ignition voltage is applied (b-3) after completion of the initial diagnosis (b-2). Even when the current pulse flowing to the lamp (b-5) is temporarily set at the LOW level and an abnormal flag is detected (b-6), the diagnosis circuit 38d does not detect an abnormal condition unless the judged pulse signal (b-7) is provided successively 15 times. If the lamp current pulses are kept at the LOW level for a long time at $x_2$, however, the judged pulse signal (b-7) is provided successively 15 times or more, and the diagnosis circuit 38d detects the abnormal condition and judges lamp breakage.

In addition, the normal diagnoses for the electric magnification adjustment unit 14 and the electric focusing unit 15 are performed in the similar procedures. Accordingly, the indication means 18c informs the operator of the surgical microscope of a defective location immediately upon occurrence of a trouble during operation of the surgical microscope. Speaking concretely, ignition of the LED 40c, for example, informs a trouble in the electric magnification adjustment means.

Since the troubleshooting means is capable of automatically performing the initial diagnosis of the illumination means before the surgical microscope is energized as described above, the troubleshooting means allows to detect and repair troubles in the illumination means before starting a surgical operation. Further, the troubleshooting means is capable of performing the initial diagnosis in cases where the cover of the lamp house is opened or closed or temperature rises abnormally in the lamp house, whereby the troubleshooting means detects defective lamp, erroneous lamp replacement, troubles in the illumination means caused by abnormal temperature rise, etc. for preventing vital errors from being caused due to troubles in the illumination means. Furthermore, the troubleshooting means performs the normal diagnoses, after the initial diagnosis, for continuously detecting or repairing troubles in the illumination means, electric magnification adjustment means and electric focusing means. Moreover, the troubleshooting means judges defective locations so that users may inform the defective locations to serviceman so as to perform speedy and adequate repair.

In addition, since the power source means of the individual units are independent of one another in the configurations described above, a trouble in a unit cannot give influence on the functions of the other units, thereby further enhancing reliability and security of the surgical microscope, and since the individual trouble detecting functions have power source means independent of one another, the surgical microscope is capable of normally detecting abnormal conditions so long as the power source means of the self-diagnosis unit operates normally even when the power source means of the units 14 through 16, for example, are troubled. In such a case, it is more desirable that said power source means are equipped with backup functions such as batteries.

Figure 22A:
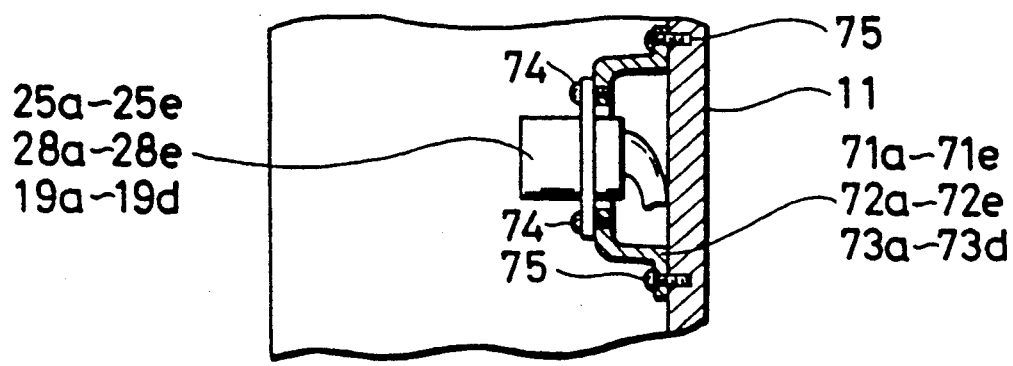
FIG. 22A and FIG. 22B are sectional views illustrating connector attachment structure, and cable and cord entry structures in the stand used in the Embodiment 1.
Figure 22B:
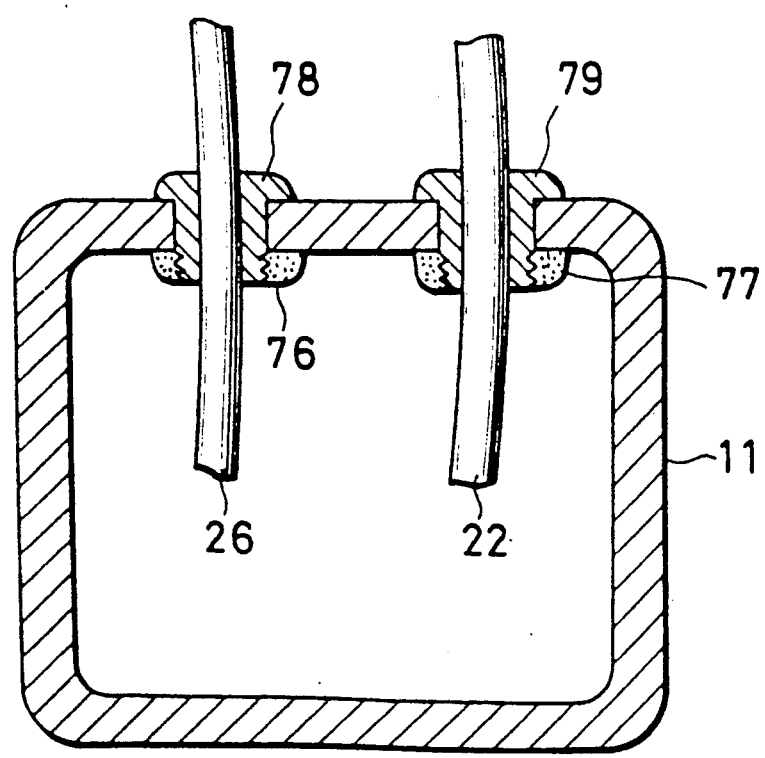
Figure 23A:
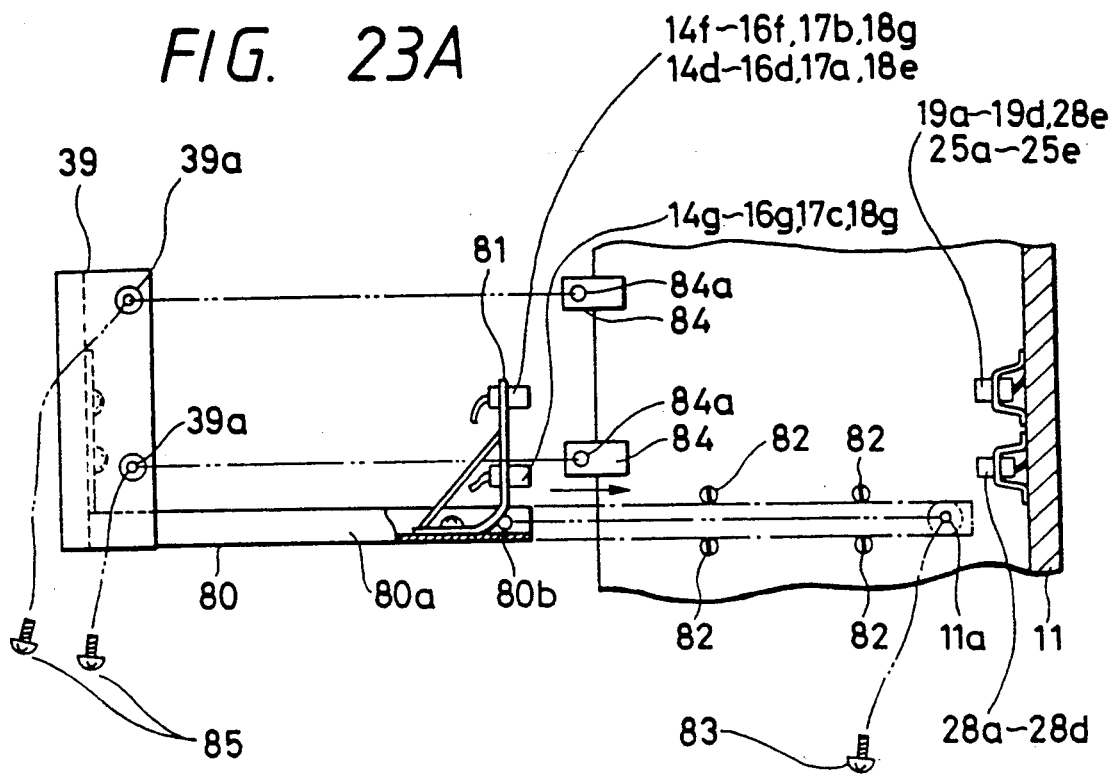
FIG. 23A and FIG. 23B are a partially broken side view and a horizontal sectional view respectively illustrating connecting structure of each unit to the stand in the Embodiment 1.
Figure 23B:
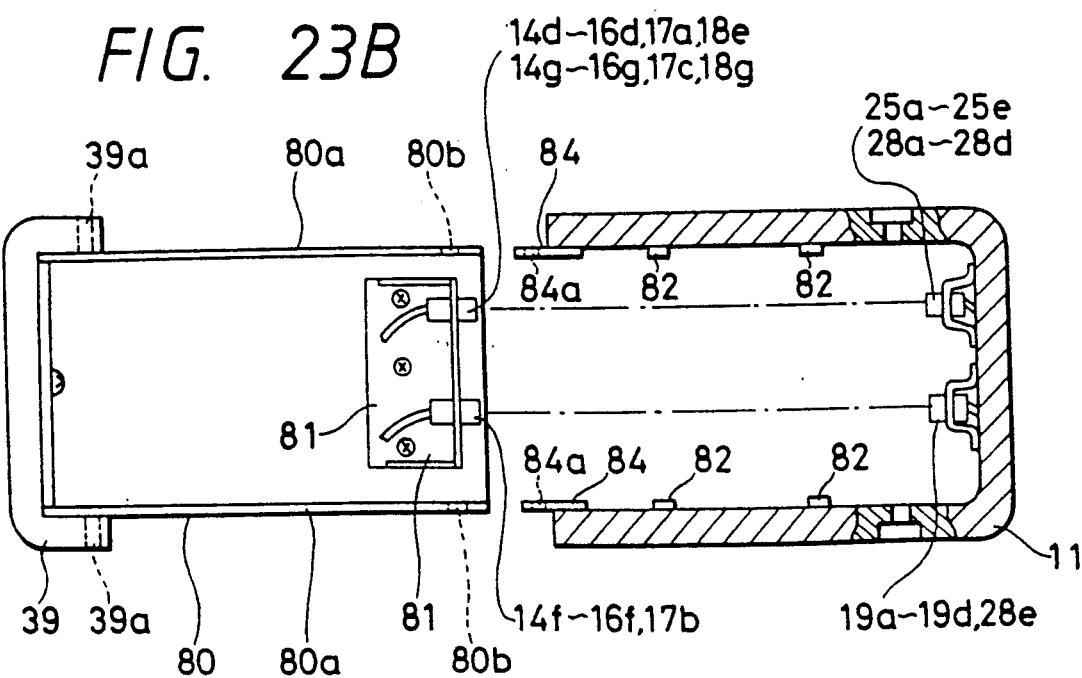
Figure 24A:
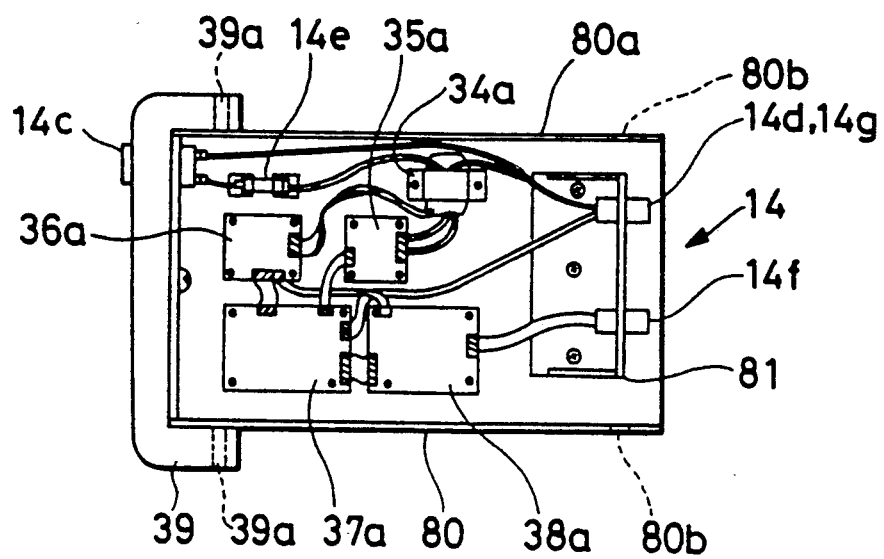
FIG. 24A and FIG. 24B are a plan view of the electric magnification adjustment unit used in the Embodiment 1 and a sectional view illustrating attachment structure of the printed circuit board of said unit to a chassis respectively.
Figure 24B:
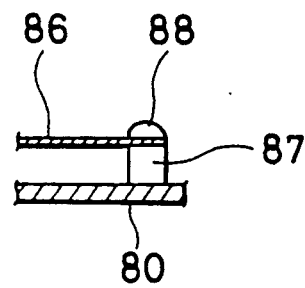

FIG. 20A shows a sectional view illustrating internal cabling in the tip of the long arm 12a which is composed of an upper arm 52 and a lower arm 53 which have a sectional shape of gutters respectively and are combined so as to form a rectangular space as illustrated in FIG. 20B. Connectors 21a, 21b, 21c and 21d are attached to a connector board 54 which is arranged so as to cover an aperture 52a formed in the upper arm 52. Cables 20a, 20b, 20c and 20d of the connectors 21a, 21b, 21c and 21d are led through the aperture 52a into the long arm 12a, bundled into a single cord 55, and held at a predetermined location with a cord retainer, for example, Type ER Wiring Accessory manufactured by PANDUIT Co., Ltd. FIG. 21 is a diagram illustrating internal cabling from the long arm 12a through the intermediate arm 12b to the top of the stand 11. The reference numerals 57 and 58 represent shafts for pivoting the upper arm 52 and lower arm 53 respectively at the root of the long arm 12a. The reference numerals 59 and 60 designate hollow shafts fixed to the lower end of the long arm 12a and the upper end of the stand 11 with bolts 61 and 62 respectively, and protecting rings 63 made of a high polymer material are fitted over these upper and lower ends. Further, the lower end of the shaft 59 and the upper end of the shaft 60 are attached, rotatably in the horizontal direction, to one end and the other end of the intermediate arm 12b by way of ball bearings 64 and bushings 65 respectively, so that the long arm 12a, the arm 12b and the stand 11 are freely rotatable in the horizontal direction. In addition, the reference numeral 66 represents a ring which is used for fixing the bushing 65 to the intermediate arm 12b. The cord 55 extends from the long arm 12a, passes through the shaft 59, enters into the 10 intermediate arm 12b, further passes through the shaft 60 and is led into the stand 11. The cord 55 is sustained with a cord retainer 68a by way of a protecting tube 67 made of glass fibers inside the long arm 12a, held with a cord retainer 68b in the intermediate arm 12b, and sustained with cord retainers 68c, 68d, 68e, 68f and 68g in the stand 11. Further, a power source cable 22 and a cord 26 leading from the foot switch unit 27 as well as a cord 29 leading from the self-diagnosis unit 18 are led into the stand 11, the power source cable 22 being sustained with cord retainers 69a, 69b, 69c, 69d and 69e, whereas the cord 29 being held at a predetermined location with cord retainers 70a, 70b, 70c and 70d. Connectors 25a, 25b, 25c, 25d and 25e for supplying power from the power source cable 22 to the individual units 14, 15, 16, 17 and 18 are fixed, with connector supports 71a, 71b, 71c, 71d and 71e interposed, to the inside wall of the stand 11 at locations corresponding to the individual units, 14, 15, 16, 17 and 18, and arranged at equal intervals. Connectors 28a, 28b, 28c, 28d and 28e which are connected to the cord 29 are fixed, at equal intervals and with connector supports 72a, 72b, 72c, 72d and 72e interposed, to the inside wall of the stand 11 at locations corresponding to the individual units 14, 15, 16, 17 and 18. Further, connectors 19a, 19b, 19c and 19d which are connected to the cord 26 and cord 55 are fixed, at equal intervals and with connector supports 73a, 73b, 73c and 73d interposed, to the inside wall of the stand 11 at locations corresponding to the individual units 14, 15, 16 and 17. Fixing structure of the connectors 19a through 19d, 25a through 25e, and 28a through 28e to the stand 11 is illustrated in FIG. 22A wherein the connectors 19a through 19d, 25a through 25e and 28a through 28e are fixed to the connector supports 73a through 73d, 71a through 71e and 72a through 72e with screws 74, whereas the connectors supports 73a through 73d, 71a through 71e and 72a through 72e are fixed to the stand 11 with screws 75. FIG. 22B shows the entry locations of the power source cable 22 and cord 26 into the stand 11. The cable and the cord are led into the stand 11 through the bushings 78 and 79 respectively fitted in the aperture of the stand 11 with bushing retainers 76 and 77 respectively. FIG. 23A and FIG. 23B are a partially broken side view and a horizontal sectional view illustrating structure for connecting each unit to the stand 11. Each unit consists of a chassis 80 and cover 39 fixed thereto. Fixed to chassis 80 are the connectors 14f through 16f, 17b, 18g, 14d through 16d, 17a, 18e, 14g through 16g, 17c and 18g, and arranged on the chassis 80 is a circuit (not shown). Each side wall 80a of the chassis 80 is guided by four guide pins 82 fixed to the inside wall of the stand 11 so as to fit each unit at a predetermined location at which the switches 14f through 16f, 17b, 18g, 14d through 16d, 17a, 18e, 14g through 16g, 17c and 18g are electrically connected to the switches 19a through 19d, 28e, 25a through 25e and 28a through 28d respectively arranged on the stand 11. Further, each unit is fixed by fitting and tightening screws 83 through holes 11a formed in both the side walls of the stand 11 into tapped holes 80b formed in the tips of both the side walls 70a of the chassis 80, and by fitting and tightening screws 85 through a pair of holes 39a formed in each of the side walls of the cover 39 into the tapped holes 84a formed in a pair of protruding pieces 84 fixed to the edge of each side wall of the stand 11. A plan view of the electric magnification adjustment unit 14, a typical example of the components units, is illustrated in FIG. 24A wherein the transformer 34a and the overcurrent protector 14e are fixed directly to the chassis 80, whereas the motor drive power source circuit 35a, control power source circuit 36a, motor control circuit 37a and current detecting circuit 38a are composed on independent boards 86 respectively which are fixed to the chassis 80 with screws 88 with spacers 87 interposed as shown in FIG. 24B.

Now, description will be made on the spare unit when it is designed as a photographic unit 89.

Figure 25:
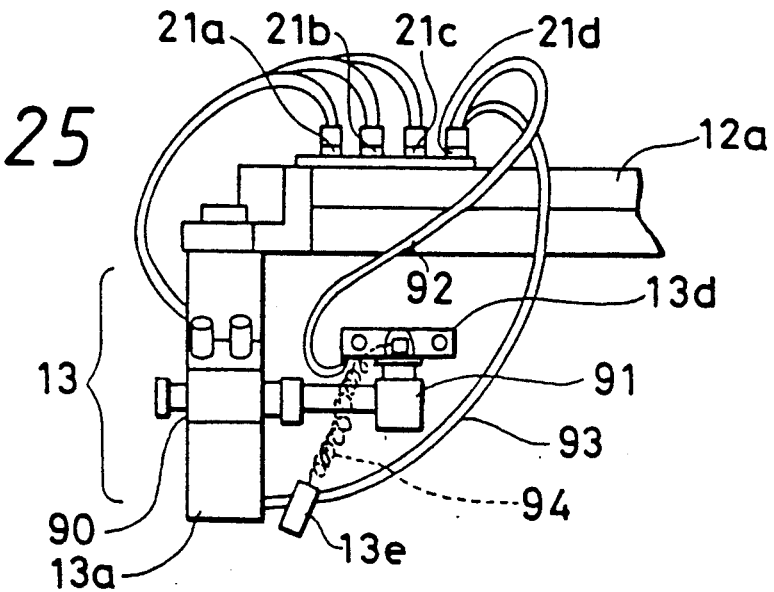
FIG. 25 is a diagram illustrating compositions of the microscope body and the tip of the long arm when the spare unit of the Embodiment 1 is designed as a photographing unit.
Figures 26A, 26B:
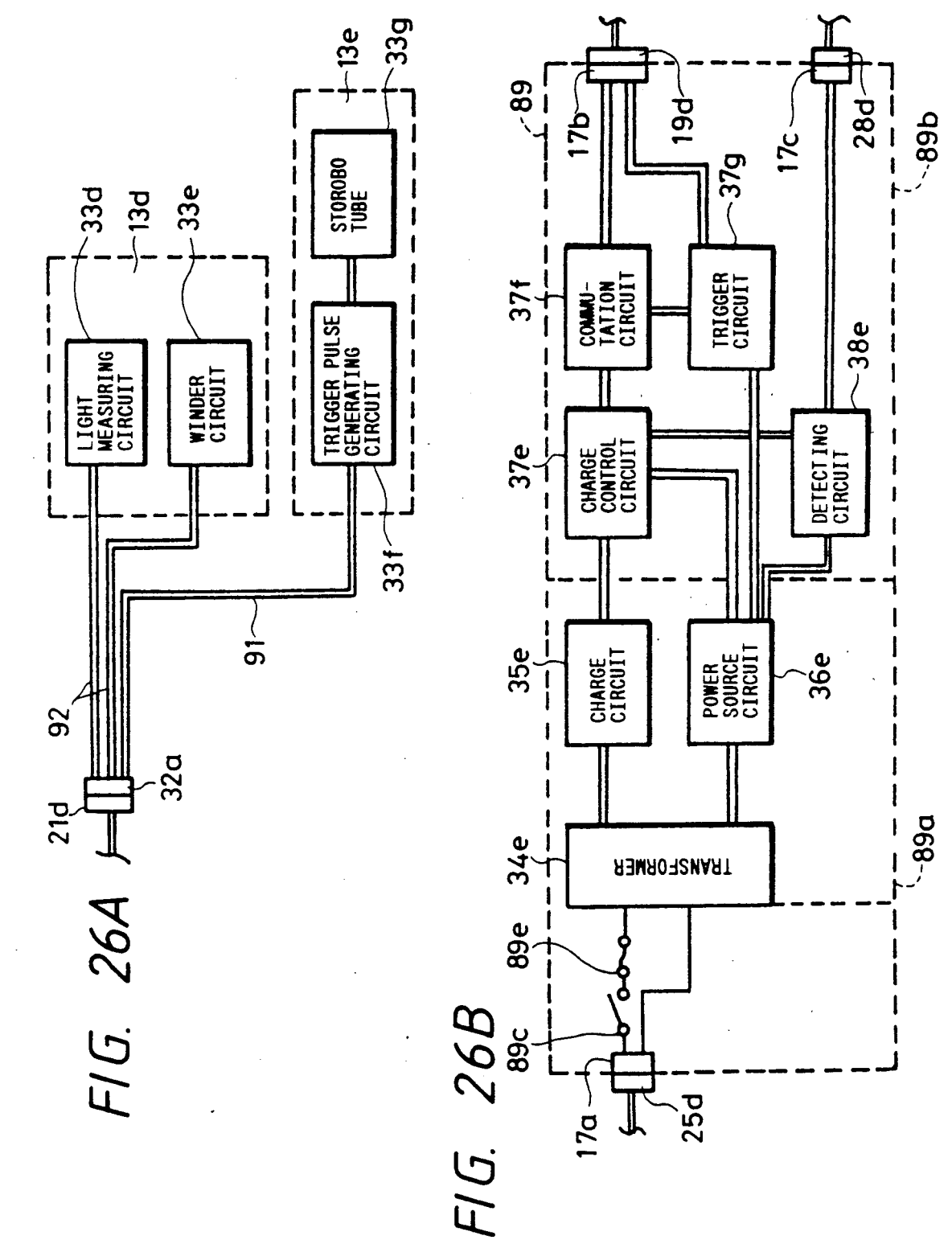

FIG. 25 shows compositions of the microscope body 13 and tip of the long arm 12a in this case. Attached to the microscope body 13 is a beam splitter unit 90, to which a 35 mm camera 13d is attached with a connecting member 91. Further, a strobe is attached to the magnification adjustment means 13a, and the camera 13d and the strobe 13e are connected to the connector 21d through a cable 92 and another cable 93 respectively. When the strobe comprises a power source means, the strobe 13e is connected directly to the camera 13d through a cable 94 and the cable 93 is unnecessary. Internal configurations of the camera and strobe are illustrated in the block diagram presented as FIG. 26A wherein the camera 13d comprises a light measuring circuit 33d and a winder circuit 33e, whereas the strobe 13e consists of a trigger pulse generator circuit 33f and a strobe tube 33g. FIG. 26B is a block diagram illustrating internal configuration of the photographic unit 89 which consists of a power source means 89a and a control means 89b. The power source means 89a is equipped with a transformer 34e which is connected to and overcurrent protector 89e and performing insulation as well as voltage transformation, a high voltage charging circuit 35e which is connected to an output terminal of the transformer 34e and functions to prepare a high voltage for charging, and a control power source circuit 36e which is connected to the other output terminal of the transformer 34e and serves to prepare a DC power for control. Further, the control means 89b is equipped with a charging control circuit 37e for controlling the current and voltage to be supplied to the camera 13d and the strobe 13e through the connector 17b, etc. with the outputs provided from the high voltage charging circuit 35e and the control power source circuit 36e, commutation circuit 37f, a commutation trigger circuit 37g, and a current/voltage detecting circuit 38e which is connected to the output of the control power source circuit 36e and functions to provide data on the current and voltage through the connector 17c, etc. to the self-diagnosis unit 18 while detecting the current and voltage flowing through the charging control circuit 37e.

Now, description will be made on the spare unit which is designed as an X-Y drive unit 95.

Figure 27A:
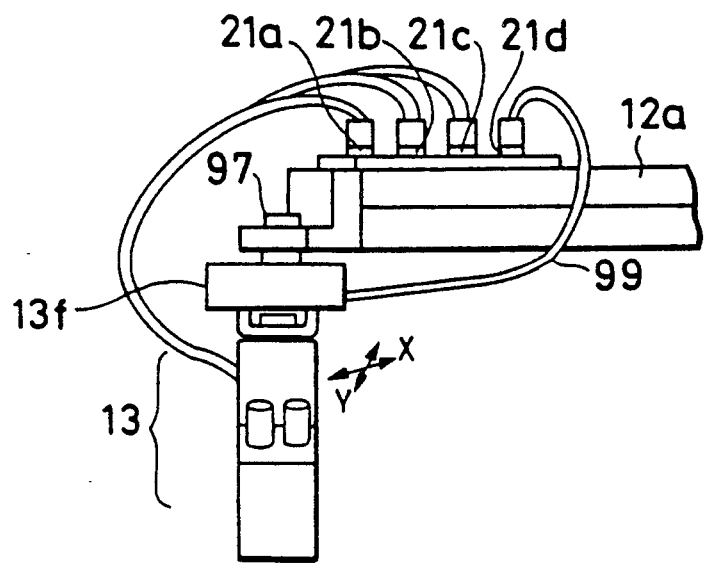
FIG. 27A and FIG. 27B are diagrams illustrating compositions of the tip of the microscope body and the tip of the long arm, and attachment structure of an X-Y drive means when the spare unit of the Embodiment 1 is designed as an X-Y drive unit.
Figure 27B:
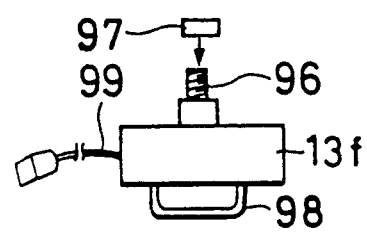
Figure 28A:
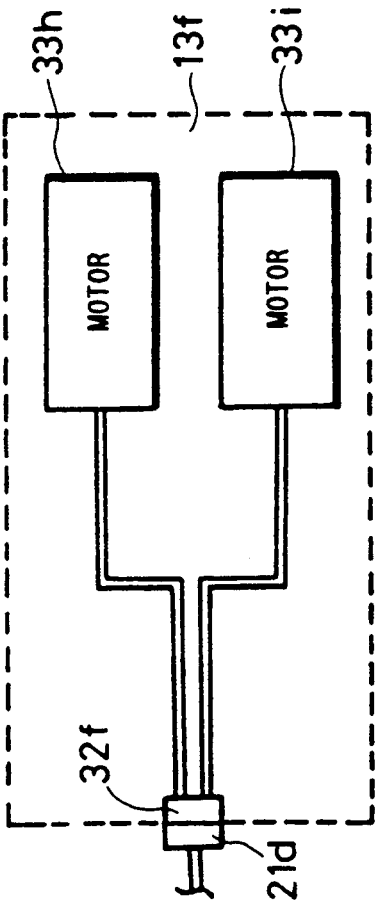
FIG. 28A and FIG. 28B are block diagrams illustrating internal configurations of the X-Y drive means and the X-Y drive unit respectively used in the Embodiment 1.
Figure 28B:
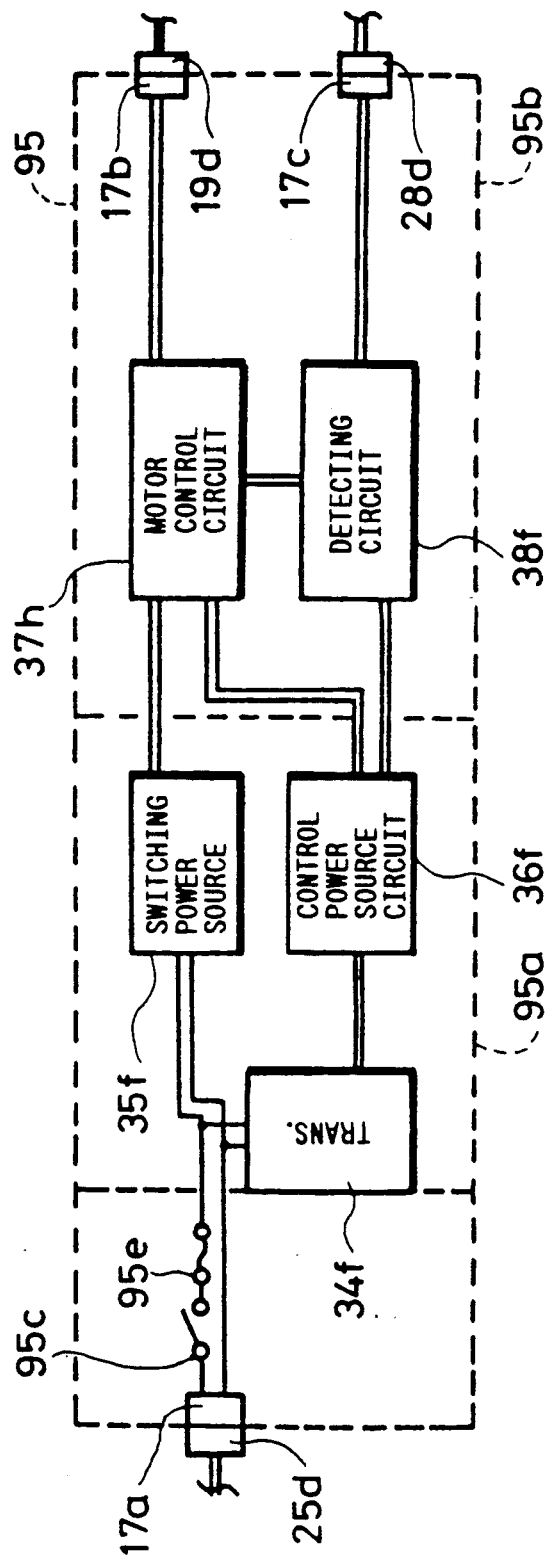
Figure 30:
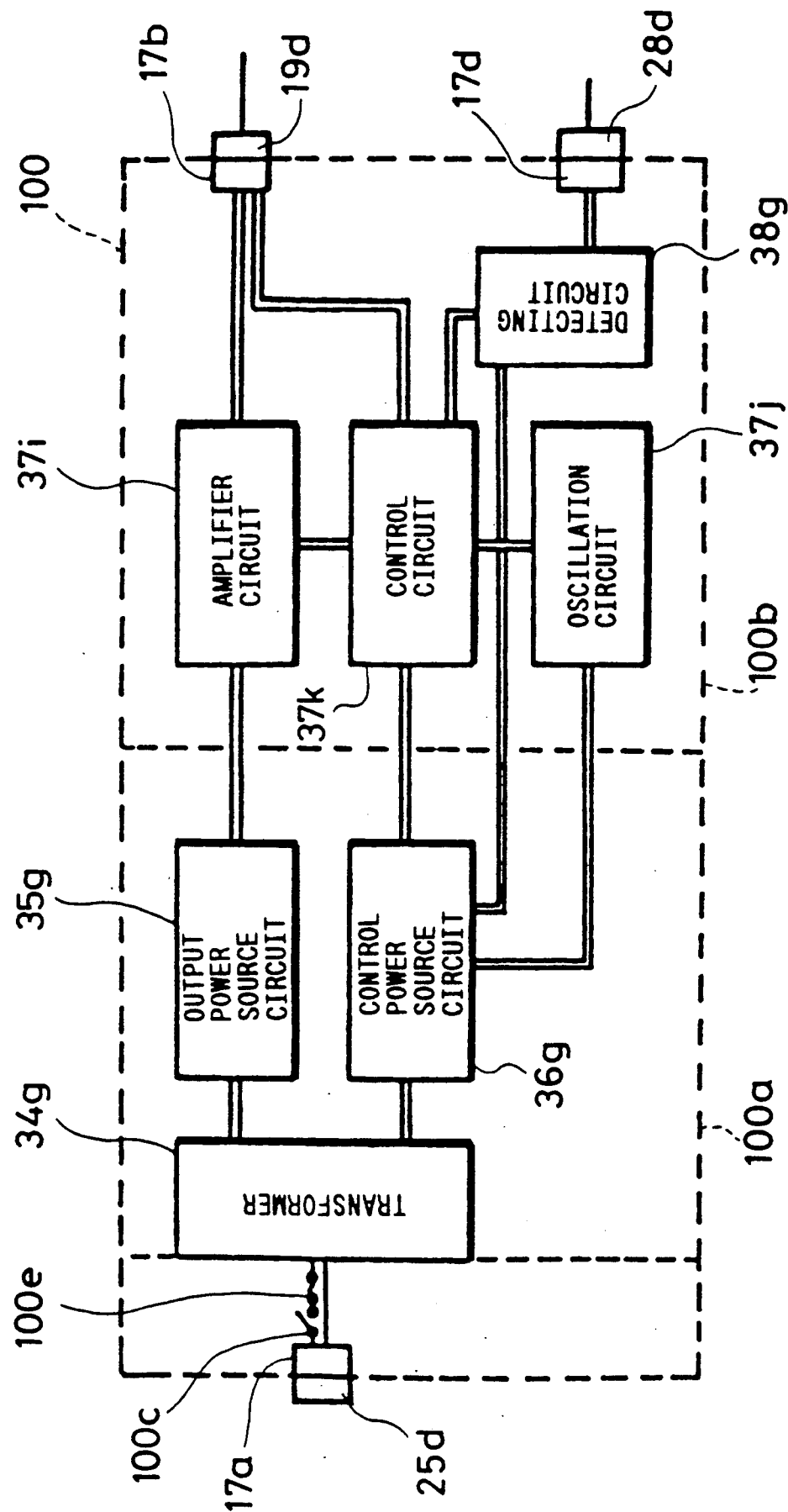

Compositions of the microscope body 13 and the tip of the long arm 12a are illustrated in FIG. 27A wherein the microscope body is to be attached to an X-Y drive means 13f which is attached to the tip of the long arm 12a. Speaking concretely, the X-Y drive means 13 is so adapted as to be attached to the tip by screwing a stopper ring 97 over a threaded shaft 96 formed on the top of the X-Y drive means as shown in FIG. 27B after said threaded shaft is fitted through the tip of the long arm 12a, and a bottom member 98 of the X-Y drive means 13f is so designed as to allow the microscope body to be attached thereto in the similar manner. Further, the X-Y drive means 13f is connected to the connector 21d through a cable 99. Internal configuration of the X-Y drive means 13f is illustrated in the block diagram presented as FIG. 28A wherein the X-Y drive means 13f is equipped with motors 33h and 33i for driving the body of the drive means (including the bottom member thereof) in the X direction and the Y direction respectively. FIG. 28B shows a block diagram illustrating internal configuration of an X-Y drive unit corresponding to the X-Y drive means described above. The X-Y drive unit consists of a subswitch 95c, a power source means 95 connected to the connector 17a through an over current protector 95e and a control means 95b. The power source means 95a is equipped with a transformer 34f which is connected to an overcurrent protector 95e and performing insulation as well as voltage transformation, a switching power source means 35f also connected to an overcurrent protector 35f, and a control power source means 36f connected to the output terminal of the transformer 34f and functions to prepare a DC power for control. Further, the control means 14b is equipped with a motor control circuit 37h for controlling the voltages to be applied to the motors 33h and 33i through the connector 17b, etc. while receiving outputs from the switching power source means 35f and the control power source circuit 36f, and a current/voltage detecting circuit 38f which is connected to the output provided from the control power source circuit 36f and provides data on the motor driving current and voltage through the connector 17c, etc. to the self-diagnosis unit 18 while detecting the motor driving current and voltage flowing through the motor control circuit 37h.

Figure 29:
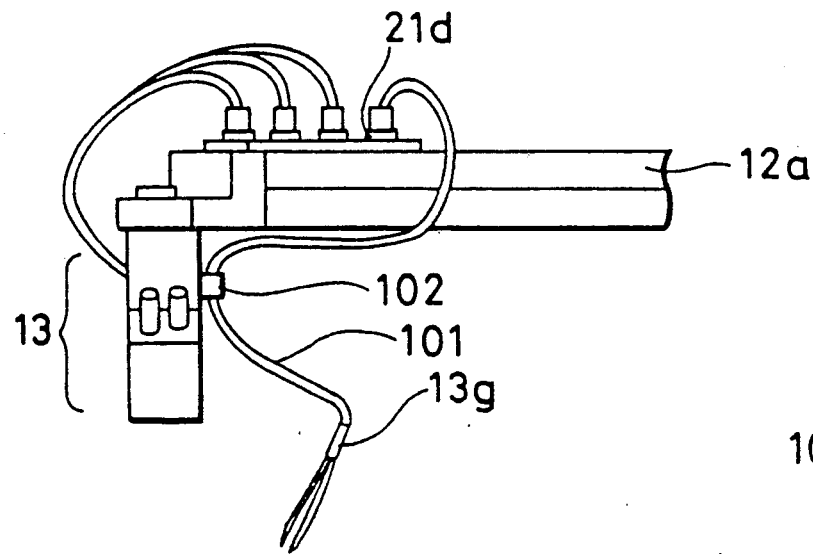
FIG. 29 and FIG. 30 are a diagram illustrating compositions of the microscope body and the tip of the long arm, and a block diagram illustrating internal configuration of a coagulation unit when the spare unit of the Embodiment 1 is designed as a coagulation unit.

Now, description will be made on the spare unit which is designed as a coagulation unit 100. Compositions of the microscope body 13 and the tip of the long arm 12a are shown in FIG. 29 wherein the coagulation means 13g is connected to the connector 21d through a cable 101 which is fixed to the microscope body 13 with a cord retainer 102. FIG. 20 is a block diagram illustrating internal configuration of a coagulation unit 100 corresponding to the coagulation means described above. The coagulation unit 100 consists of a subswitch 100c, a power source means 100a connected to the connector 17a through an overcurrent protector 100e and a control means 100b. The power source means 100a is equipped with a transformer 34g which is connected to the overcurrent protector 100e and performs insulation as well as voltage transformation, an output power source circuit 35g which is connected to an output terminal of the transformer 34g and prepares coagulating power, and a control power source circuit 36g which is connected to the other output terminal of the transformer 34g and prepares a DC power for control. Further, the control means 100b is equipped with an amplifier circuit 37i for amplifying output from the output power source circuit 35g and supplying the output to the coagulation means 13g through the connector 17b, an oscillator circuit 37j and a control circuit 37k which are connected to the control power source circuit 36g and control the current and voltage to be fed from the amplifier circuit 37i to the coagulation means 13g, and a current/voltage detecting circuit 38g which is connected to the output terminals of the control power source circuit 36g and provides data on the current and voltage 20 through the connector 17c, etc. to the self-diagnosis unit 18 while detecting the current and voltage flowing through the control circuit 37h.

Figure 31:
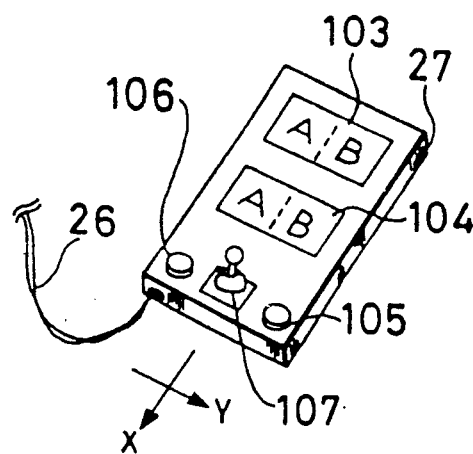
FIG. 31 is a perspective view of a foot switch unit used in the Embodiment 1.

FIG. 31 illustrates a perspective view of the foot switch unit 27 wherein the reference numeral 103 represents a seesaw switch which is connected to the electric magnification adjustment unit 14 and functions to drive the magnification adjustment means 13a for changing magnification, the reference numeral 104 designates a seesaw switch which is connected to the electric focusing unit 15 and used for moving up and down the focusing means 13b, the reference numeral 105 denotes a push-button switch which is connected to the lamp illumination unit 16 and is used for changing brightness of the lamp means 13c, the reference numeral 106 represents an option switch which is connected to the spare unit and functions as a release switch or a power switch when the spare unit 17 is designed as the photographic unit 89 or the coagulation unit 100, and the reference numeral 107 designates a switch which is connected also to the spare unit 17 and is used for driving the X-Y drive means 13f in the X and Y directions when the spare unit 17 is designed as the X-Y drive unit 95. In addition, the photographic unit 89 the X-Y drive unit 95 and the coagulation unit 100 have fundamental mechanical structures which are similar to those of the units 14, 15 and 16.

The Embodiment 1 has the configuration described above and can prevent influence due to trouble occurring in a unit, for example, a trouble in the power source means 14a of the electric magnification adjustment unit 14, since the electric focusing unit 15, lamp illumination unit 16 and the self-diagnosis unit 18 have the power source means 14a, 15a and 16a which are independent from the power source means 14a of the electric magnification adjustment unit 14. Though operability of the magnification adjustment means 13a is degraded by such a trouble, the other units, i.e., the electric focusing unit 15 and the lamp illumination unit 16 operate normally, thereby allowing to continue surgical operation and enhancing security of the surgical microscope. Further, the self-diagnosis unit which has the independent power source means 18a can operate with no inconvenience, and functions to display, on the indication means 18c, the trouble condition in the power source means 14a of the electric magnification adjustment unit 14. Furthermore, the power source means 14a is designed as a small member which requires checks only within a narrow range. Accordingly, the Embodiment 1 permits locating troubles speedily and restoring the normal condition simply by replacing a defective unit with a new one in a short time, thereby enhancing maintainability and security of the surgical microscope.

Further, a defective unit can easily be taken out simply by removing the screws 83, 85 and so on. During the replacement of a unit, connections and disconnections between the connectors and between the units and the main switch are automatically performed in conjunction with removal and setting of the unit fror and into the stand as described above.

Furthermore, an option unit, for example the photographic unit, can be set simply by removing the spare unit 17 having only the cover 39 and inserting the photographic unit 89 into position. When the unit is set in position, the connector 19d is connected to the photographic unit 89, and the timing signal and the exposure control signal required for photographing are ready for transmission to the connector 21d attached to the tip of the arm 12, whereby photographing can be carried out easily with the b 35 mm camera 13d and strobe 18e connected to the connector 21d as described above. In addition, the other optional units, i.e., the X-Y drive unit 95 and the coagulation unit 100 can be replaced in the similar procedures. Accordingly, it is possible to change the function of the connector 21d attached to the tip of the arm 12 in accordance with type of the unit set as the spare unit 17. In other words, the Embodiment 1 permits modifying type of the device to be used in the condition connected to the connector 21d. As a result, the Embodiment 1 requires only a small number of units to be set on the stand 11 and permits composing a compact surgical microscope. Further, the Embodiment 1 allows a thin cable to be accommodated in the arm 12 so as to provide higher operability. Furthermore, the capability to modify the functions of the connectors attached to the tip of the arm 12 makes it possible to accommodate the power source means for the devices required for each surgical operation into the stand of the microscope, and provide signals and powers from the connectors attached to the tip of the arm 12. Therefore, the Embodiment 1 makes it possible to make a site of surgical operation free from the power sources and cables for various devices which are conventionally scattered around the site, reserve sufficient space around the site so as to assure working flexibility or facilitating aids of surgical operations by assistants and nurses. Further, the Embodiment 1 provides a merit to reduce power consumption since it allows to stop power supply to the units which are not used for a surgical operation by turning OFF the subswitches therefor. Furthermore, the Embodiment 1, wherein the power source means have simple functions matched with the functions of the individual units, provides another merit to facilitate to design the power source means and lowers possibility of trouble occurrence in the power source means.

Though the Embodiment 1 comprises a single spare unit 17, it is easy to arrange a plural number of spare units, and it is sufficient for this purpose to connect connector signals and/or the power source cables for the option units to the connectors arranged on the tip of the arm 12 in relationship of 1:1.

Figure 32:
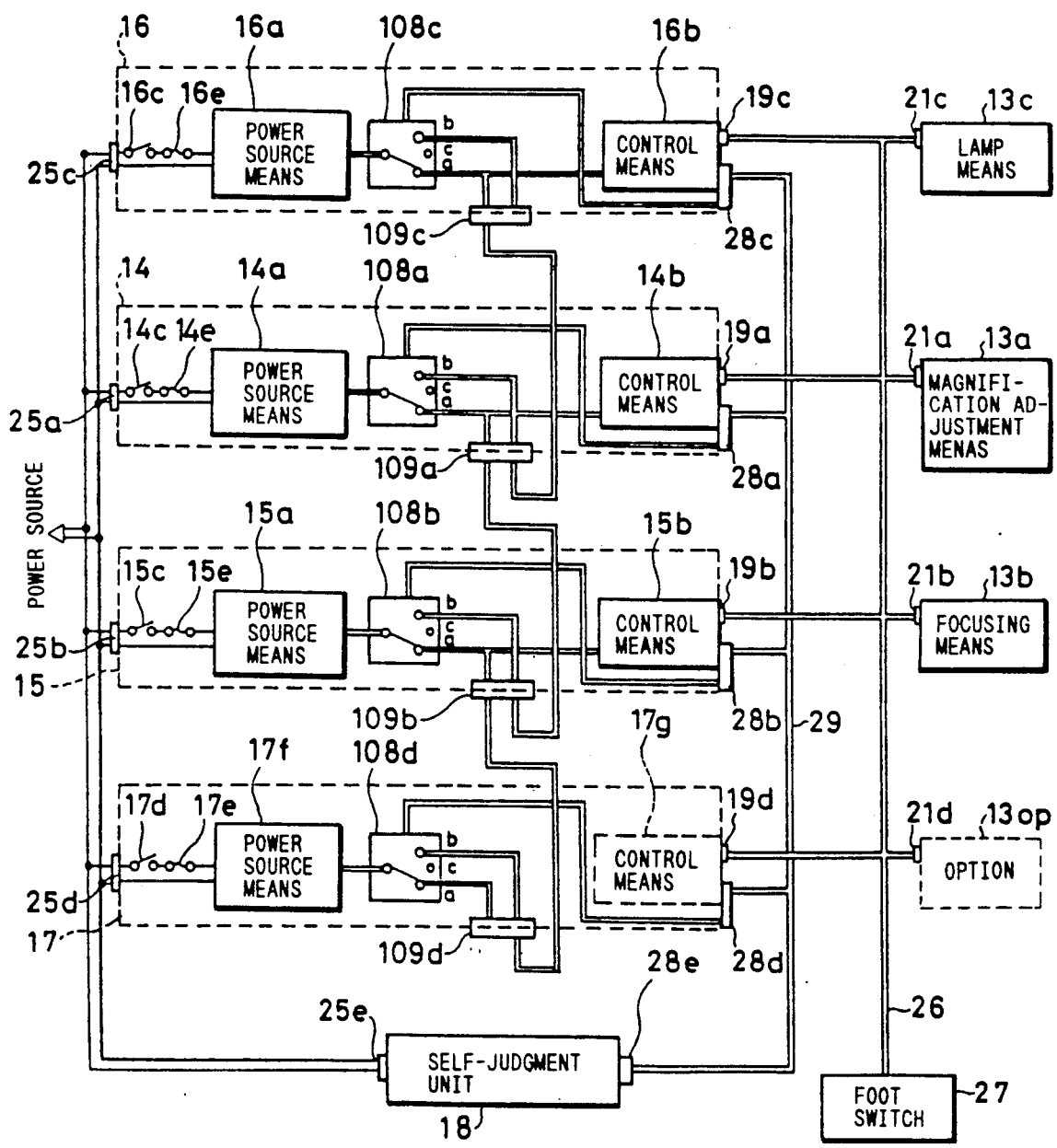
FIG. 32 is a block diagram illustrating an Embodiment 2 of the present invention.

Though all the control means for the individual units are independent from one another in the Embodiment 1 described above, it is possible to use a power source means of a certain unit commonly to another unit as in the Embodiment 2 described below. FIG. 32 shows a block diagram illustrating the Embodiment 2 of the present invention wherein the power source means 14a, 15a, 16a and 17a of the individual units 14, 15, 16 and 17' provide outputs on the same level and connected to switching means 108a, 108b, 108c and 108d having the same composition. Further, the switching means 108a, 108b, 108c and 108d are connected to the self-diagnosis unit 18 through the connectors 28a, 28b, 28c and 28d respectively, and so adapted as to be capable of connecting each movable contact to any one of terminals a, b and c in accordance with a signal provided from the self-diagnosis unit 18.

The terminals a on the switching means 108a, 108b, 108c and 108d are connected to the control means 14b, 15b, 16b and 17g of the units, and to connectors 109a, 109b, 109c and 109d arranged in the stand 11 as described later. Further, the terminals b on the switching means 108a, 108b, 108c and 108d are connected to the connectors 109a, 109b, 109c and 109d respectively. The terminals c on the switching means 108a, 108b, 108c and 108d are connected nowhere. In addition, the self-diagnosis unit 18 is equipped with a circuit for controlling the switching means 108a, 108b, 108c and 108d of the individual units. Speaking concretely, the Embodiment 2 is designed in such a manner that higher priorities are given to the lamp illumination unit 16, the electric magnification adjustment unit 14, the electric focusing unit 15 and the spare unit 17' in this order and that the control unit controls the switching means so as to backup the power source means of a unit having higher priority with the power source means of a unit having lower priority. With regard to the spare unit 17', the reference symbol 17d represents a subswitch and the reference symbol 17e designates an overcurrent protector.

Figure 33:
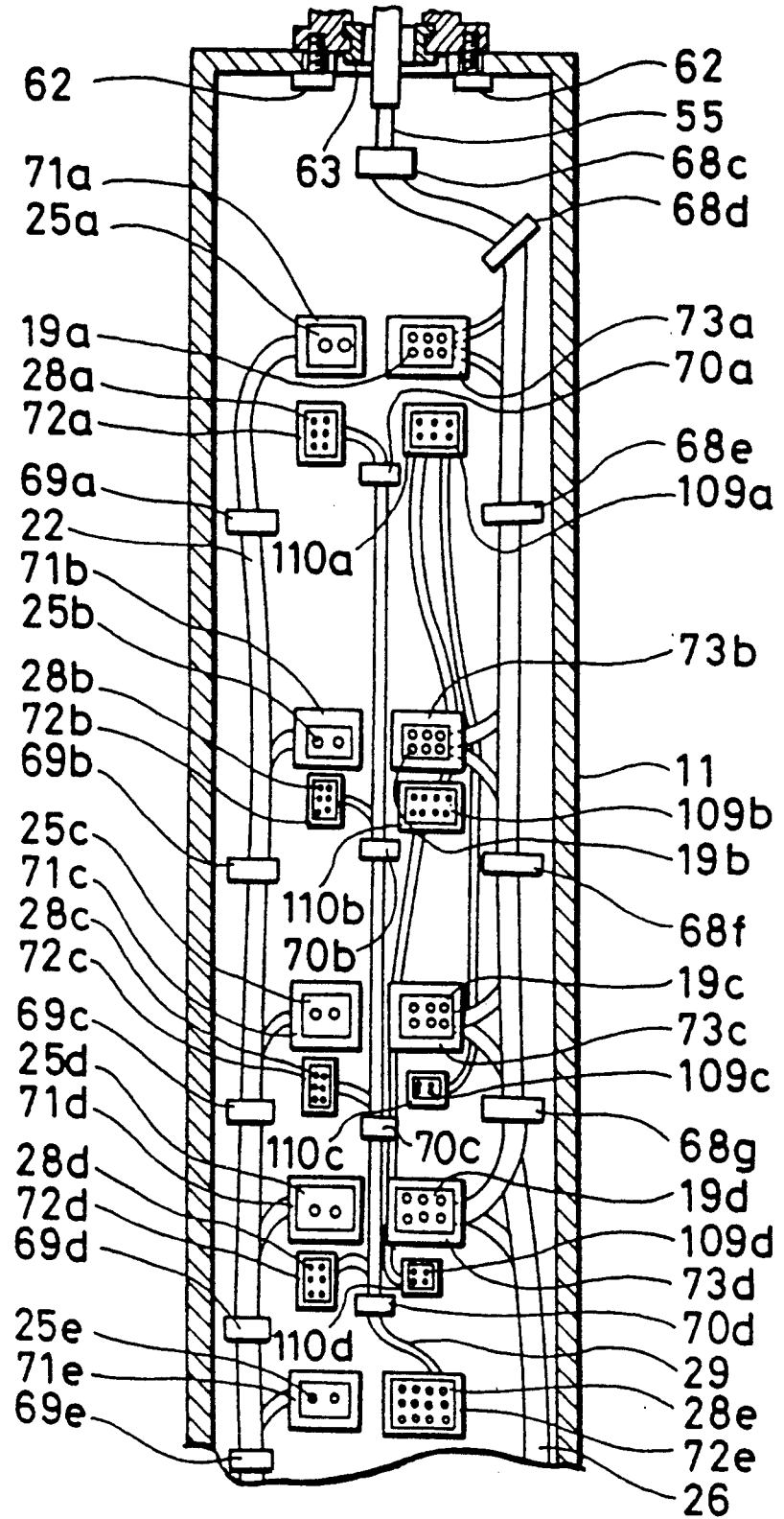
FIG. 33 is a sectional view illustrating cabling in the top of the stand in the Embodiment 2.

FIG. 33 is a block diagram illustrating internal cabling in the top of the stand 11 in the Embodiment 11 which is quite the same as that in the Embodiment 1, except for the connectors 109a, 109b, 109c and 109d which are fixed by way of the connector supports 110a, 110b, 110c and 110d to the inside wall of the stand 11 at locations corresponding to the locations of the individual units 14, 15, 16 and 17' respectively.

Should the power source means 16a of the lamp illumination unit 16 be troubled in the Embodiment 2 having the configuration described above, the self-diagnosis unit 18 detects the trouble in the power source means 16a, switches the movable contact on the switching means 108a from the terminal a to the terminal b, and then switches the movable contacts from the terminals a to the terminals b on the switching means 108a, 108b and 108d on the electric magnification adjustment unit 14, the electric focusing unit 15 and the spare unit 17'. Further, if the power source means 15a of the electric focusing unit 15 becomes troubled, the self-diagnosis unit 18 switches the movable contact on the switching means 108b of the electric focusing unit from the terminal a to the terminal c. Then, the self-diagnosis unit 18 switches the movable contact on the switching means 108d of the spare unit 17' from the terminal b. As is understood from the foregoing description, the Embodiment 2 is capable, in case of a trouble of a power source means in a certain unit, of automatically switching the power source means so as to back up the power source means of a unit having higher priority with the power source means of a unit having lower priority and making the unit having low importance inoperative, thereby enhancing security of the surgical microscope. Especially when option means are not connected, the power source means 17f of the spare unit 17' is used as the auxiliary power source means, the functions of the surgical microscope remain unchanged and surgical operation can be continued regardless of troubles occurred in the power source means of any unit.

Figure 35:
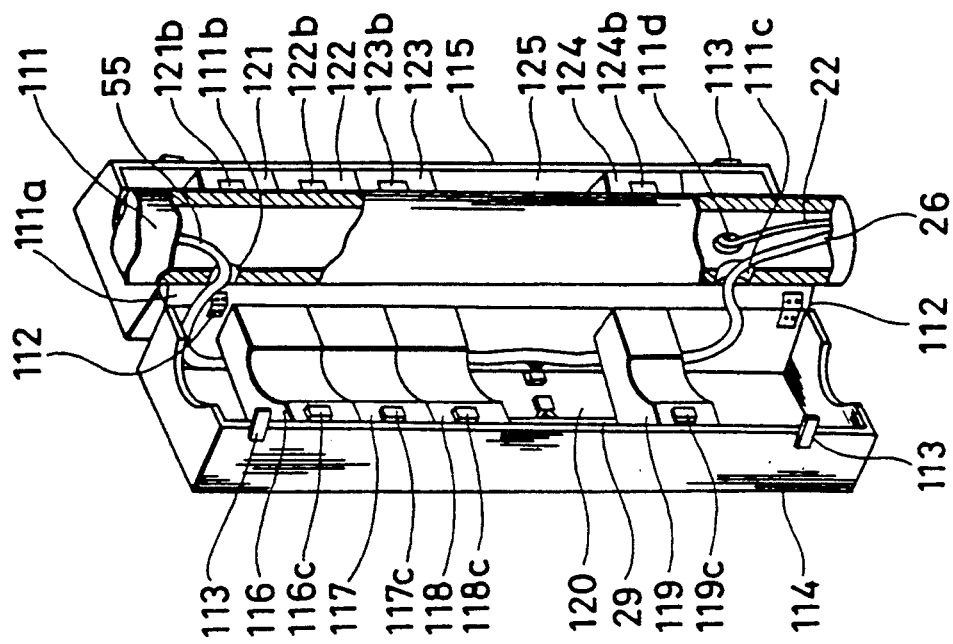
FIG. 34 and FIG. 35 are perspective views illustrating an open condition and a closed condition of the stand in an Embodiment 3.
Figure 34:
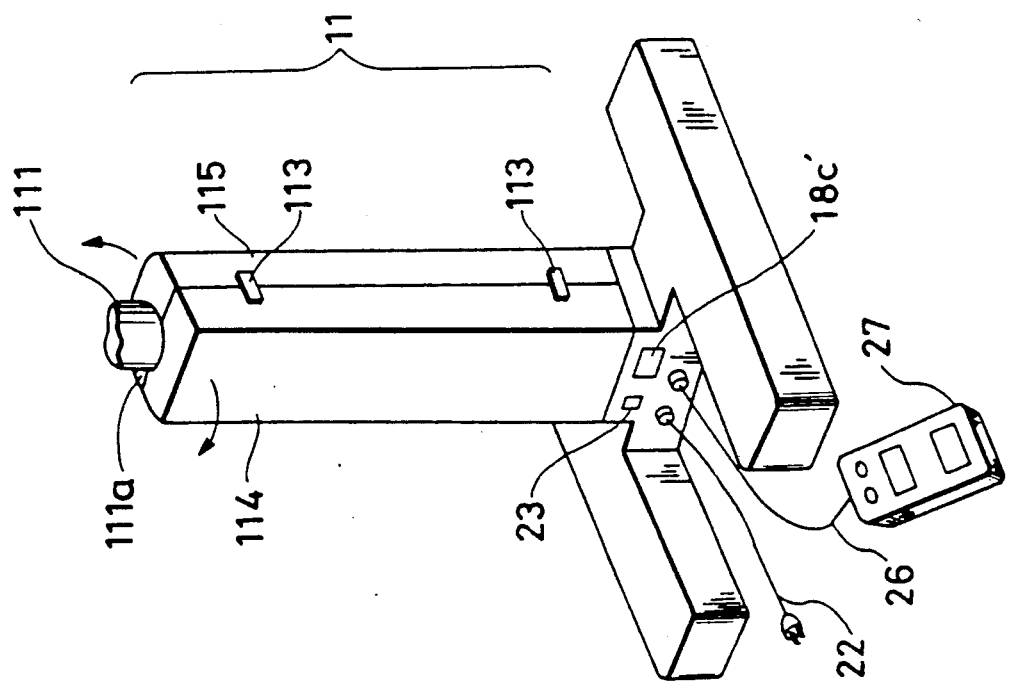
Figure 36:
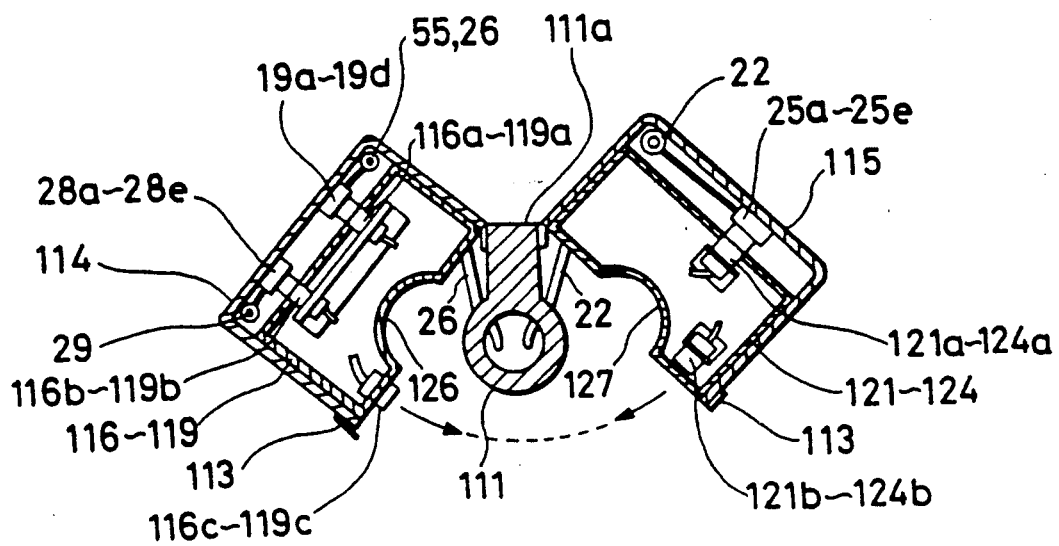
FIG. 36 is a horizontal sectional view illustrating an open condition of the stand used in the Embodiment 3.
Figure 37:
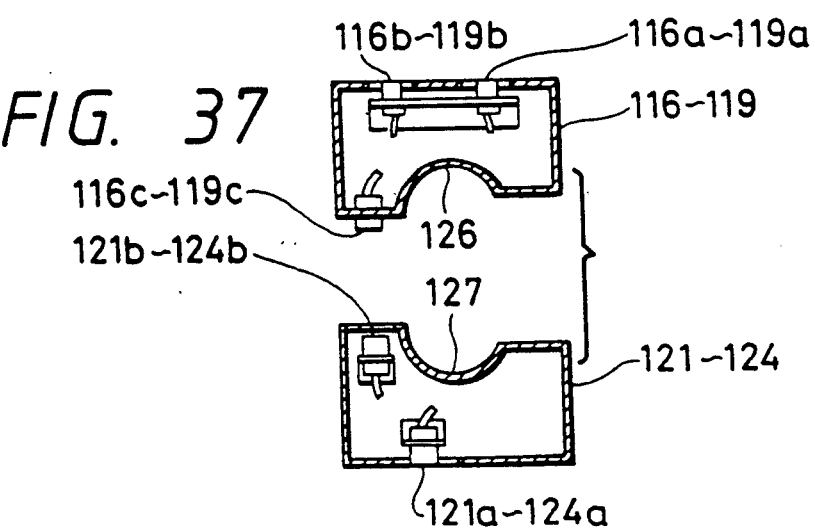
FIG. 37 is horizontal sectional view illustrating units used in the Embodiment 3.

Though the unit configurations of the Embodiments 1 and 2 described above can be judged from the external appearances thereof, it is possible to obtain the same functions with an internal unit configuration which cannot be known from and external appearance, like that of the Embodiment 3 described below. Further, it is possible to divide each unit into a power source unit and a control unit as in the Embodiment 3. FIG. 24 and FIG. 35 are perspective views of the stand 11 used in the Embodiment 3 in a closed condition and an open condition thereof respectively. The stand 11 sustains the intermediate arm 12b (not shown) rotatably in the horizontal direction, has a hollow structure, and is attached to a sustaining column 11 having a protruding strip 111a formed along a generating line on the outside surface thereof and circular cross sectional shape and to the protruding strip 11a in such a manner that it is rotatable or freely openable and closable. The stand 11 is so adapted as to be locked with a pair of lock devices while surrounding the sustaining column 111 in the closed condition (FIG. 34), and consists of a left outer frame 114 and right outer frame 115 comprising power source units and control units having separate functions described later. Required cabling is arranged in the sustaining column 11, the left outer frame 114 and the right outer frame 115. In addition, each of the outer frames has the same length as the protruding strip 111a. The cord 55 extending from the intermediate arm 12b passes through the sustaining column 111 and a hole 111b formed in the wall, and then is led into the left outer frame 114. The cord 26 extending from the foot switch unit 27 passes through the sustaining column 11 and a hole 111c formed in the wall, and then is led into the left outer frame 114. Further, the power source cord 22 is extended through the sustaining column 11 and a hole 111d formed in the wall, and led into the right outer frame 115. Arranged on the inside walls of the outer frames 114 and 115 are required cords and connectors in the manner similar to that in the Embodiment 1. As shown in FIG. 36 illustrating a horizontal sectional view of the stand, for example, arranged in the left outer frame 114 are the connectors 19a through 19d connected to the cords 55 and 26 at locations corresponding to the individual control units and the connectors 28a through 28e connected to a cord 29 leading from the self-diagnosis unit as described later, whereas connectors 25a through 25e connected to the cable 22 are arranged on the right outer frame 115. Further, accommodated in the left outer frame 114 are an electric magnification adjustment unit 116, and an electric focusing unit 117, a lamp illumination control unit 118 and a self-diagnosis control unit 119 as well as a space 120 for an option control unit. Further, accommodated in the right outer frame 115 are an electric magnification adjustment power source unit 121, an electric focusing power source unit 122, a lamp illumination power source unit 123 and a self-diagnosis power source unit 124 as well as a space 125 for an option power source unit. Each of the control units 116 through 119 and each of the power source units 121 through 124 have, at centers of the inside surfaces thereof, curved surfaces 126 and 127 respectively of shapes matched with the outside circumference of the sustaining column 111 so as to bring the corresponding units into contact with each other when both the outer frames 114 and 115 are closed. (See FIG. 37) Arranged on the outside surface of the control units 116 through 119 are connectors 116a through 119a and connectors 116b through 119b to be connected to the above-mentioned connectors 19a through 19d and connectors 28a through 28e respectively, whereas arranged on the inside surface of each control unit are connectors 116c through 119c for electrically connecting the corresponding power source units. On the other hand, arranged on the outside surfaces of the power source units 121 through 124 are connectors 121a through 124a to be connected to said connectors 25a through 25e, and arranged on the inside surface thereof are connectors 121b through 124b for electrical connection to the corresponding control units. The connectors 25e, 28e are connectors of the option unit. When both the outer frames 114 and 115 are closed by turning them in the directions indicated by the arrows in FIG. 36, the connectors 116c through 119c are connected to the connectors 121b through 124b respectively so that powers are supplied from the power source units 121 through 124 to the control units 116 through 119. In addition, the control circuits and the power source circuits arranged in the control units 116 through 119 and the power source units 121 through 124 are the same as those used in the other Embodiments already described above and will not be described specifically.

The Embodiment 3 having the composition described above and comprising a column as the member for sustaining the arm has twisting rigidity higher than that in any of the other Embodiments using a console having a large aperture area as the member for sustaining the arm. Accordingly, the Embodiment 3 allows less swinging of the tip of the arm sustaining the microscope body and reduces swinging of image being observed.

Figure 38:
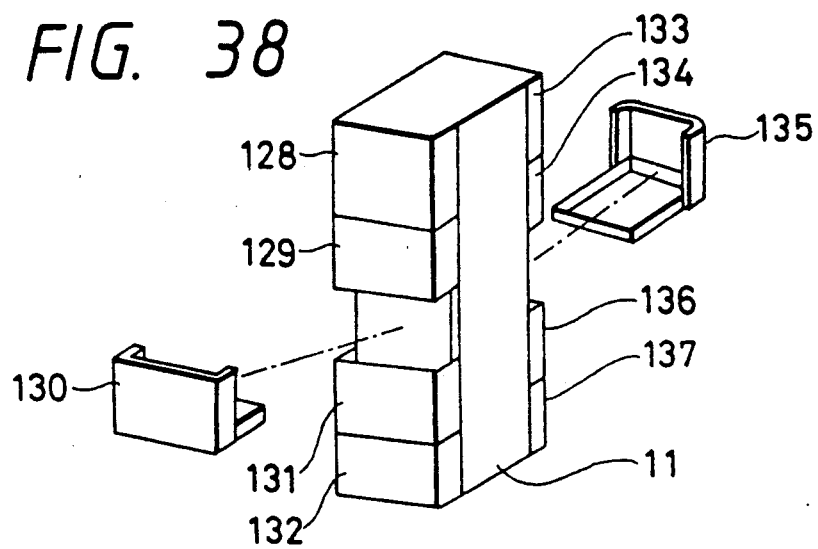
FIG. 38 is a perspective view illustrating a stand in an Embodiment 4 of the present invention.
Figure 39A:
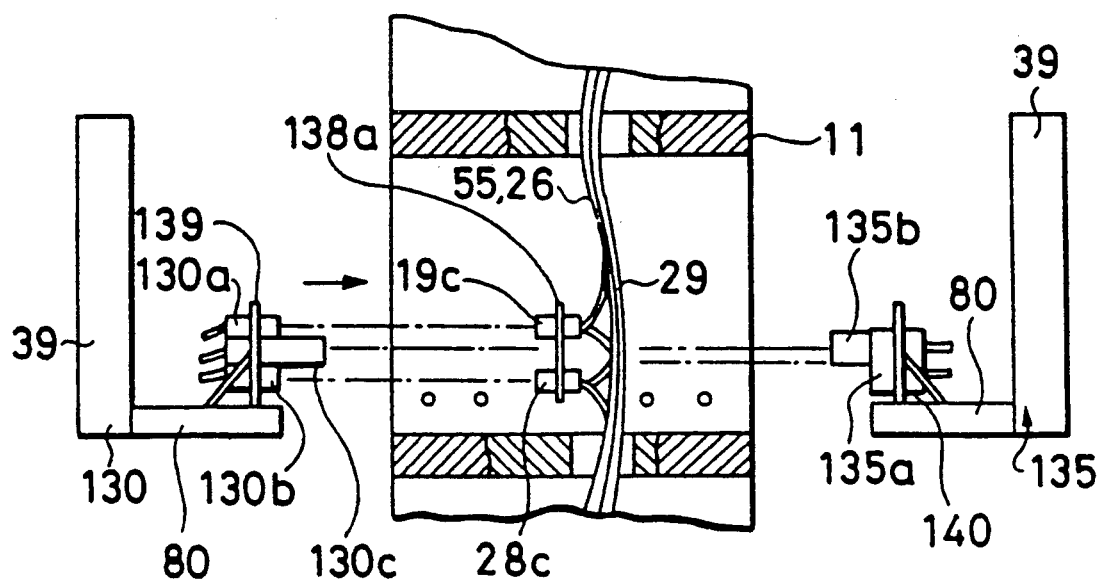
FIG. 39A and FIG. 39B are longitudinal and horizontal sectional views illustrating the main members of a stand used in the Embodiment 4.
Figure 39B:
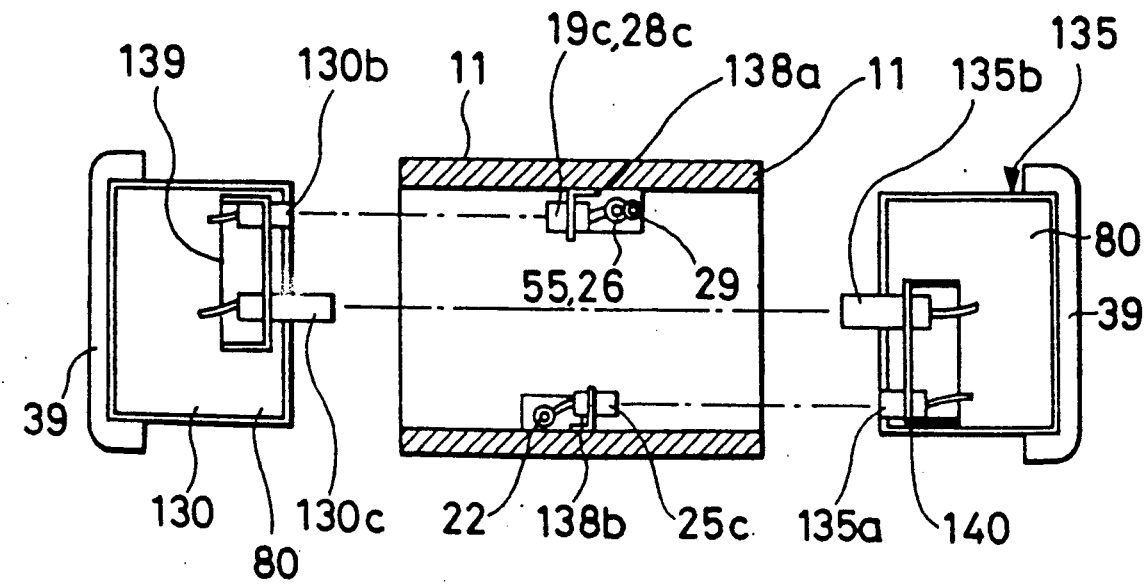

Now, description will be made on Embodiment 4 comprising the individual units are divided into power source units and control units as in the Embodiment 3, but having an external appearance so adapted as to permit judging configuration thereof. FIG. 38 shows a perspective view of the Embodiment 4 wherein an electric magnification adjustment control unit 128, an electric focusing control unit 129, a lamp illumination control unit 130, a spare control unit 131 and a self-diagnosis control unit 132 are set removably on one side of the stand 11, whereas an electric magnification adjustment power source unit 133, an electric focusing power source unit 134, a lamp illumination power source unit 135, a spare power source unit 136 and a self-diagnosis power source unit 137 are removably set on the other side of the stand 11. Each of these units is inserted and fixed to the stand 11 with screws or the similar means, and corresponding control units and the power source units are electrically connected to each other when set in position. Taking the lamp illumination control unit 130 and the lamp illumination power source unit 135 as typical examples, structures thereof will be described detailedly below. FIG. 39A and FIG. 39B are a longitudinal sectional view and a horizontal sectional view of the main parts of the stand 11 into and from which the lamp illumination control unit 130 and the lamp illumination power source unit 135 are to be inserted and removed. The connector 19c connected to the cord 55, 26 and the connector connected to the cord 29 are fixed to one of the inside wall of the stand 11 with a connector support 138 interposed, whereas the connector 25c connected to the cable 22 is fixed to the other inside wall with a connector support 138b interposed. Further, connectors 130a, 130b and 130c are fixed to the lamp illumination control unit 130 with a connector support 139 interposed whereas connectors 135a and 135b are fixed to the lamp power source unit 135 with a connector support 140 interposed so that the connector 130a is connected to the connector 19c, the connector 130b is connected to the connector 28c, the connector 135a is connected to the connector 25c and the connector 130c is connected to the connector 135b respectively when both the units 130 and 135 are inserted and fixed to the stand 11. In addition, the control circuits and power source circuits to be set in both the units 130 and 135 are the quite the same as those used in the other Embodiments described above and will not be described in particular. The other units are designed so as to have the similar configurations.

The Embodiment 4 having the configuration described above permits establishing electrical connections among the stand and obtaining the same functions as those of the Embodiment 1 simply by inserting the individual power source units and control units into the stand 11 and fixing the units to the stand 11. Further, the Embodiment 4 wherein each unit is divided into the power source unit and the control unit is capable of reducing the cost required for replacement when performance of the control units is improved or when a unit becomes defective. Further, since the power source unit is compatible with any type of control units, the Embodiment 4 permits restoring the normal function of a defective power source unit simply by replacing it with another power source unit in cases where a power source unit of a certain control unit is troubled.

Figure 40:
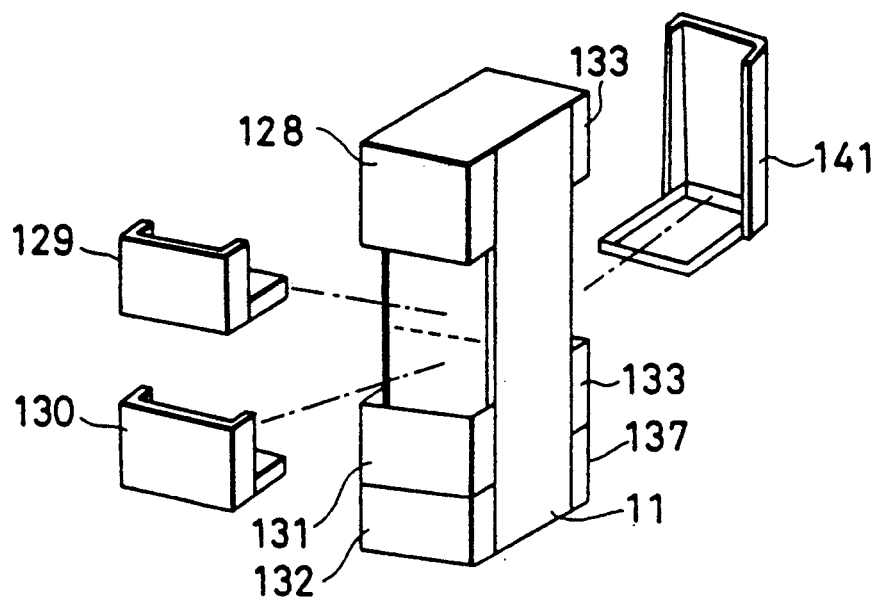
FIG. 40 and FIG. 41 are a perspective view of a stand and a longitudinal sectional view illustrating the main members thereof used in an Embodiment 5 of the present invention.
Figure 41:
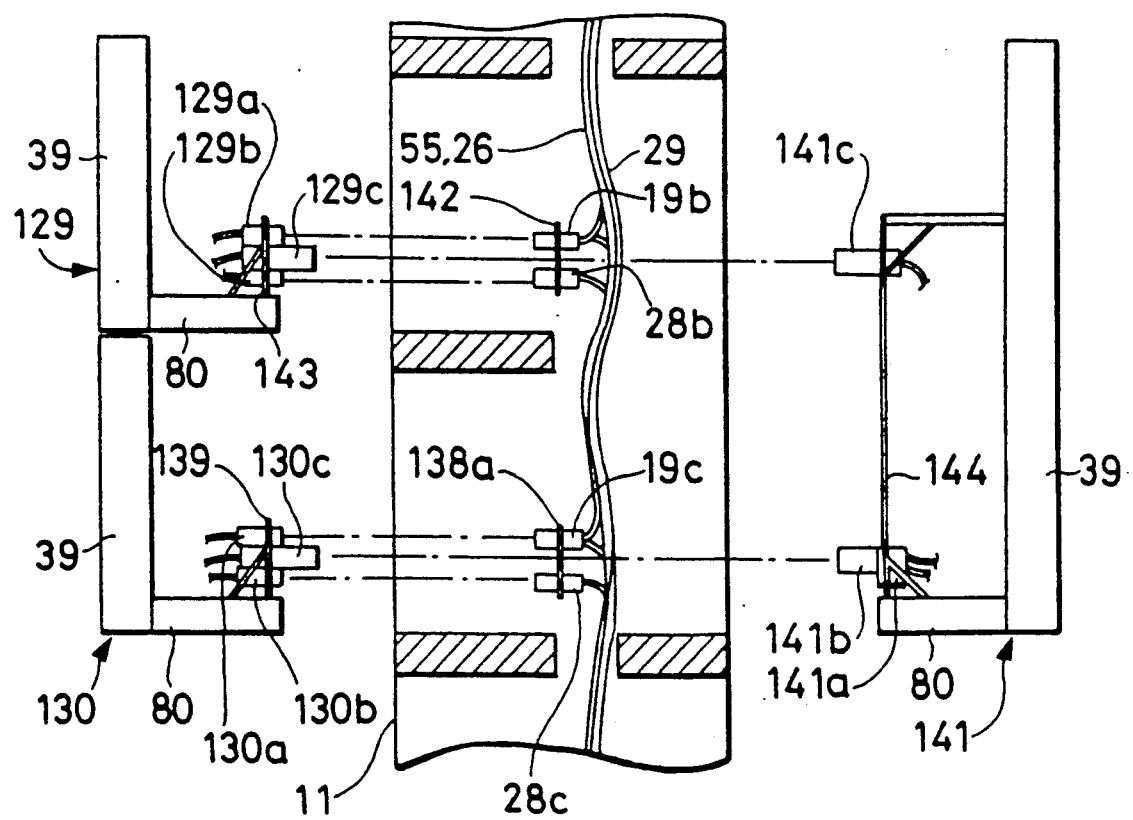

Though the power source units correspond to the control units in the relation of 1:1 in the Embodiments 3 and 4 described above, it is possible to correspond a power source unit to a plural number of control units as in the Embodiment 5 described below. FIG. 40 illustrates a perspective view of the Embodiment 5 which is the same as the Embodiment 4, except for a common power source unit 141 corresponding, for example, to the electric focusing control unit 129 and the lamp illumination control unit 130 can be freely inserted and removed into and from one side of the stand 11 in the Embodiment 5. FIG. 41 is a longitudinal sectional view of the main parts of the stand 11 which is so adapted as to permit inserting and removing the common power source unit 141 for the electric focusing control unit 129 and the lamp illumination control unit 130. The surface of the inside wall of the stand 11 corresponding to the lamp illumination control unit 130 has the same structure as that described with reference to the Embodiment 4, and the connector 19b connected to the cord 55, 26 and the connector 28b connected to the cord 29 are fixed to the area of the inside wall of the stand 11 corresponding to the electric focusing control unit 129 with a connector support 142 interposed. Further, fixed to the electric focusing control unit 129 are connectors 129a, 129b and 129c with a connector support 143 interposed. On the other hand, fixed to the common power source unit 141 are a connector 141c at the location corresponding to the electric focusing control unit 129, and a connector 141a at the location corresponding to the lamp illumination control unit 130 respectively with a connector support 144 interposed. When both the control units 129 and 130 as well as the common power source unit 141 are inserted and fixed to the stand 11, the connectors 129a, 129b and 129c are connected to the connectors 19b, 141c and 28b respectively, the connectors 130a, 130b and 130c are connected to the connector 19c, 141b and 28c respectively, and the connector 141a is connected to the connector 25c connected to the cable 22 (not shown). In addition, the control circuits arranged in both the control units 129 and 130 as well as the power source circuit arranged in the common power source unit 141 are the same as those used in the other Embodiments described above, and will not be described specifically.

Figure 42:
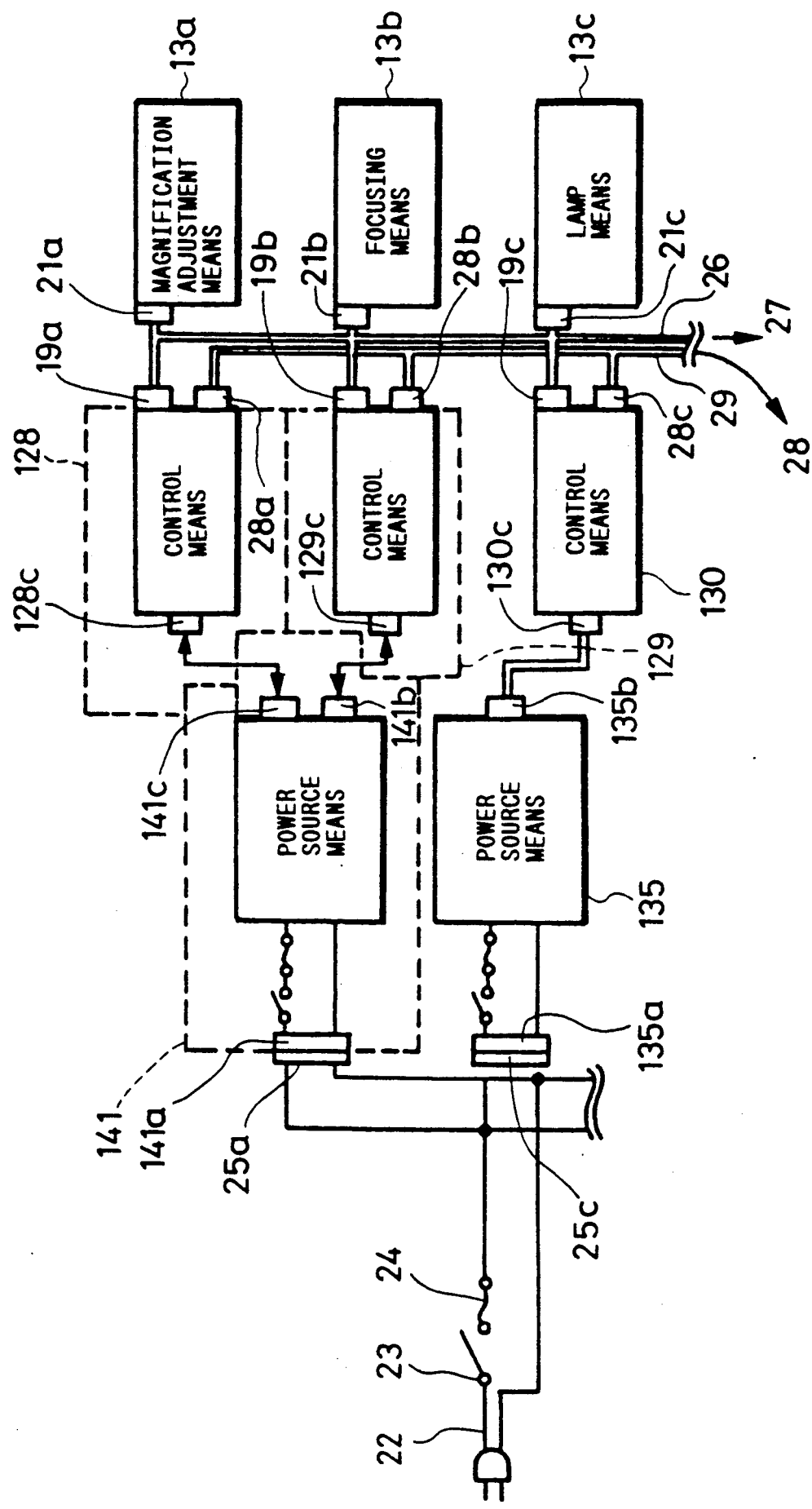
FIG. 42 is a block diagram illustrating the main members used in the Embodiment 5.

The Embodiment 5 having the configuration described above is capable of establishing electrical connections among the stand, the individual power source units and the individual control units, and obtaining the same functions as those of the Embodiment 1 simply by inserting and fixing the individual power source units and control units to the stand 11. Since the Embodiment 5 is so designed as to correspond a single power source unit to two control units, the Embodiment 5 allows to reduce the cost required for the power source units. In addition, it is possible to select, as the two control units to be corresponded to a single power source unit, the two units having the same or similar specifications for power source, for example, the electric magnification adjustment control unit 128 and the electric focusing control unit 129 as illustrated in the block diagram presented as FIG. 42. Furthermore, it is possible to correspond three or more control units to a single power source unit.

Though the self-diagnosis unit is designed as an independent unit in the Embodiments 1 through 5 described above, it is possible to design the individual units so as to have self-diagnosis functions as in the Embodiment 6 described below.

Figure 43:
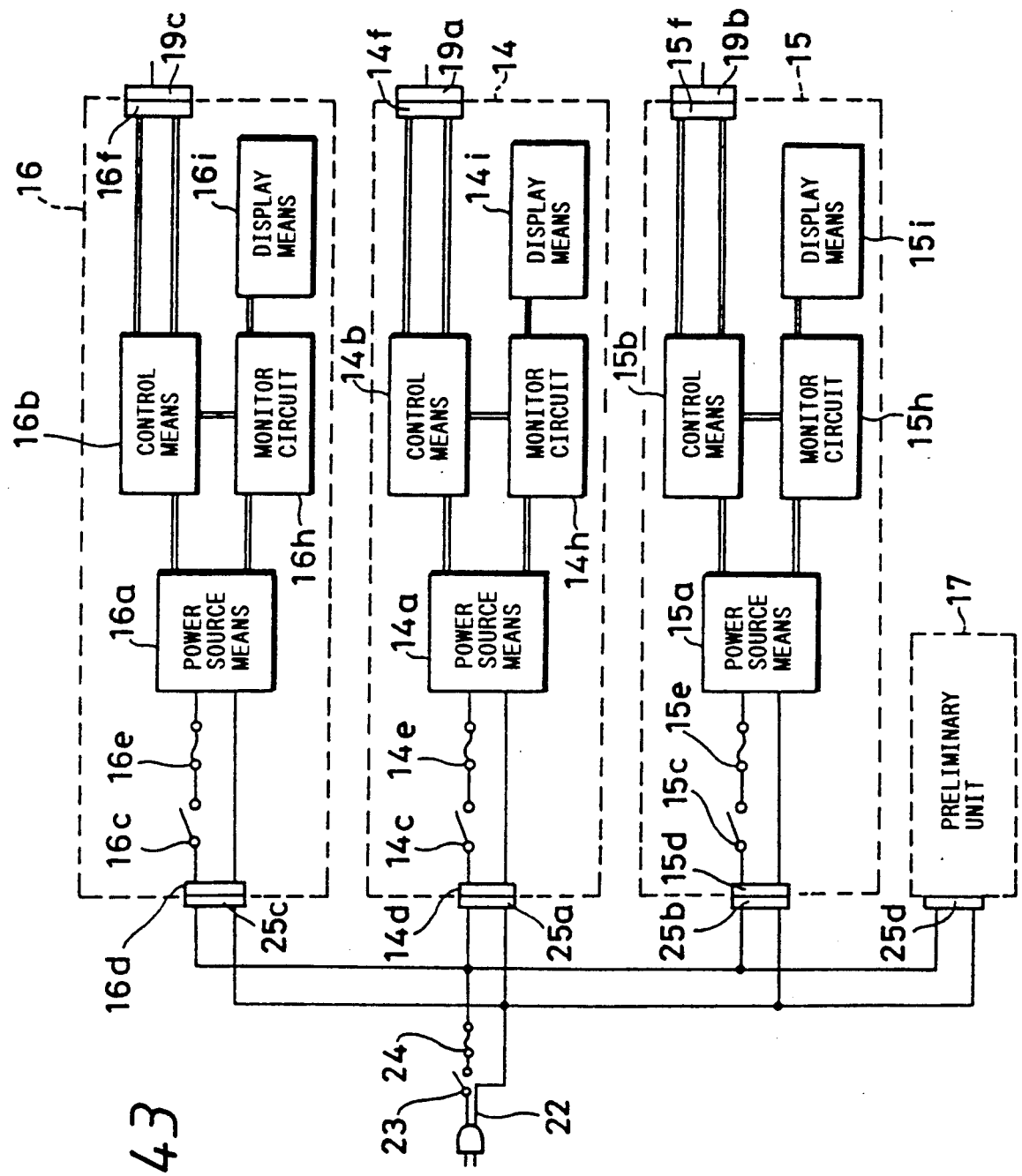
FIG. 43 and FIG. 44 are a block diagram illustrating an Embodiment 6 of the present invention and a perspective view illustrating an electric magnification adjustment unit therefor respectively.

FIG. 43 is a block diagram illustrating the Embodiment 6. The Embodiment 6 has the same configuration as that of the Embodiment 1, expect for facts that the units 14, 15 and 16 are connected to the output terminals of the power source units 14a, 15a and 16a respectively, and comprise current/voltage monitor circuits 14h, 15h and 16h for monitoring the currents and voltages flowing through the individual control means as well as indication means 14i, 15i and 16i, and that the self-diagnosis unit 18 as well as the cord 29 and the connectors 28a through 28e for connecting the self-diagnosis unit 18 to the units 14, 15 and 16 are not used, or deleted in FIG. 21, in the Embodiment 6.

Figure 44:
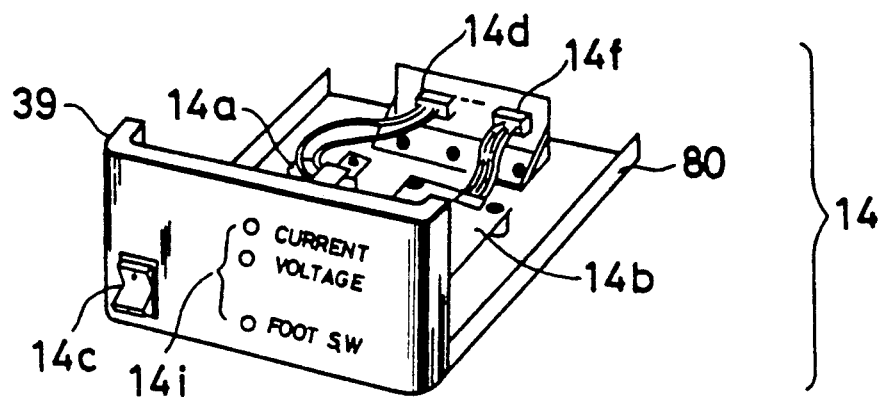

FIG. 44 illustrates a perspective view of the electric magnification adjustment unit 14, selected as a representative of the units, which has the quite the same mechanical composition as that used in the Embodiment 1, expect for an indication means 14i arranged on the cover 39 and a current/voltage monitor circuit 14h (not shown) arranged on the chassis 80 in the Embodiment 6.

The Embodiment 6 having the configuration described above is capable of detecting troubles occurred in the power source means 14a of the electric magnification adjustment unit 14 with the current/voltage monitor circuit 14h and displaying the data on the indication means 14i. The Embodiment 6 simplifies the cabling inside the stand 11 since it makes unnecessary to use the self-diagnosis unit and arrange, inside the stand 11, the cabling for connecting the self-diagnosis unit to the individual units. Further, the Embodiment 6 enhances sucurity of the surgical microscope since the individual units comprise independent self-diagnosis circuits and, should a single self-diagnosis circuit become defective in a certain unit, the other units can normally perform the self-diagnoses of their own. Furthermore, the Embodiment 6 facilitates detection of defective units since the individual units have indication means respectively.

Figure 45A:
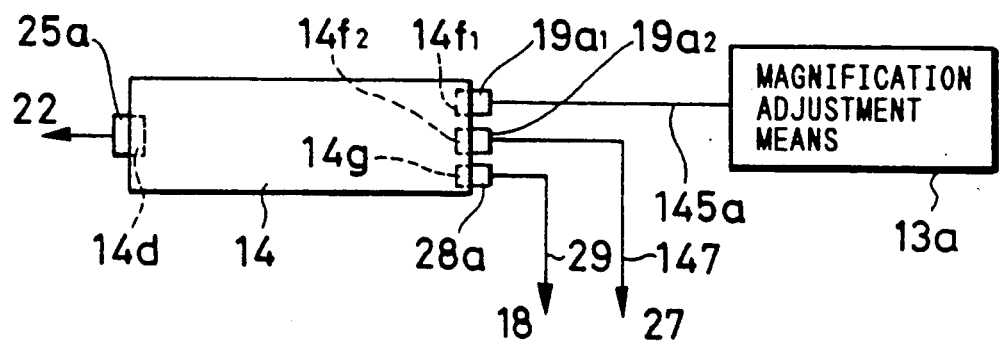
FIG. 45A and FIG. 45B are a block diagram and a rear view illustrating an electric magnification adjustment unit used in an Embodiment 7 of the present invention.
Figure 45B:
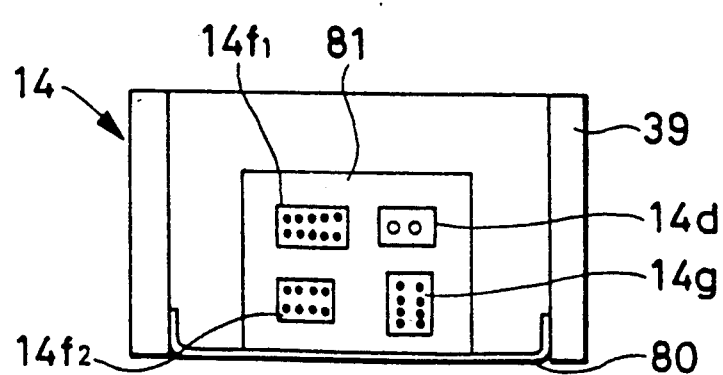

Though the units arranged in the stand 11 are connected to the cables and the cords arranged in the stand and the arm through the connectors arranged in the stand, and the operating members in the magnification adjustment means, etc. are connected to the cables and cords arranged in the stand and the arm through the connectors attached to the tip of the arm in the Embodiments described above, it is possible not to use the connectors arranged on the tip of the arm, but to pass the cables leading from the operating members directly through the arm and the stand so as to be connected to the units through connectors as in the Embodiment 7 to be described below. FIG. 45A and FIG. 45B are a block circuit diagram and a rear view of the electric magnification adjustment unit 14 selected as a typical example of the units used in the Embodiment 7. In the Embodiment 7, the connector 19a for connecting the electric magnification adjustment unit 14 to the magnification adjustment means 13a and the foot switch unit 27 is divided into two connectors 19$a_1$ and 19$a_2$ which are connected to the magnification adjustment means 13a and the foot switch unit 27 respectively, and the connector 14f on the electric magnification adjustment unit 14 is also devided into two connectors 14$f_1$ and 14$f_2$ which are connected to the connectors 19$a_1$ and 19$a_2$ respectively. Also on the other units, the connectors for connection to the operating members are arranged separately from connectors to be connected to the foot switch unit 27. In the other respects, configurations of the individual units in the Embodiment 7 are the same as those adopted in the Embodiment 1.

Figure 46:
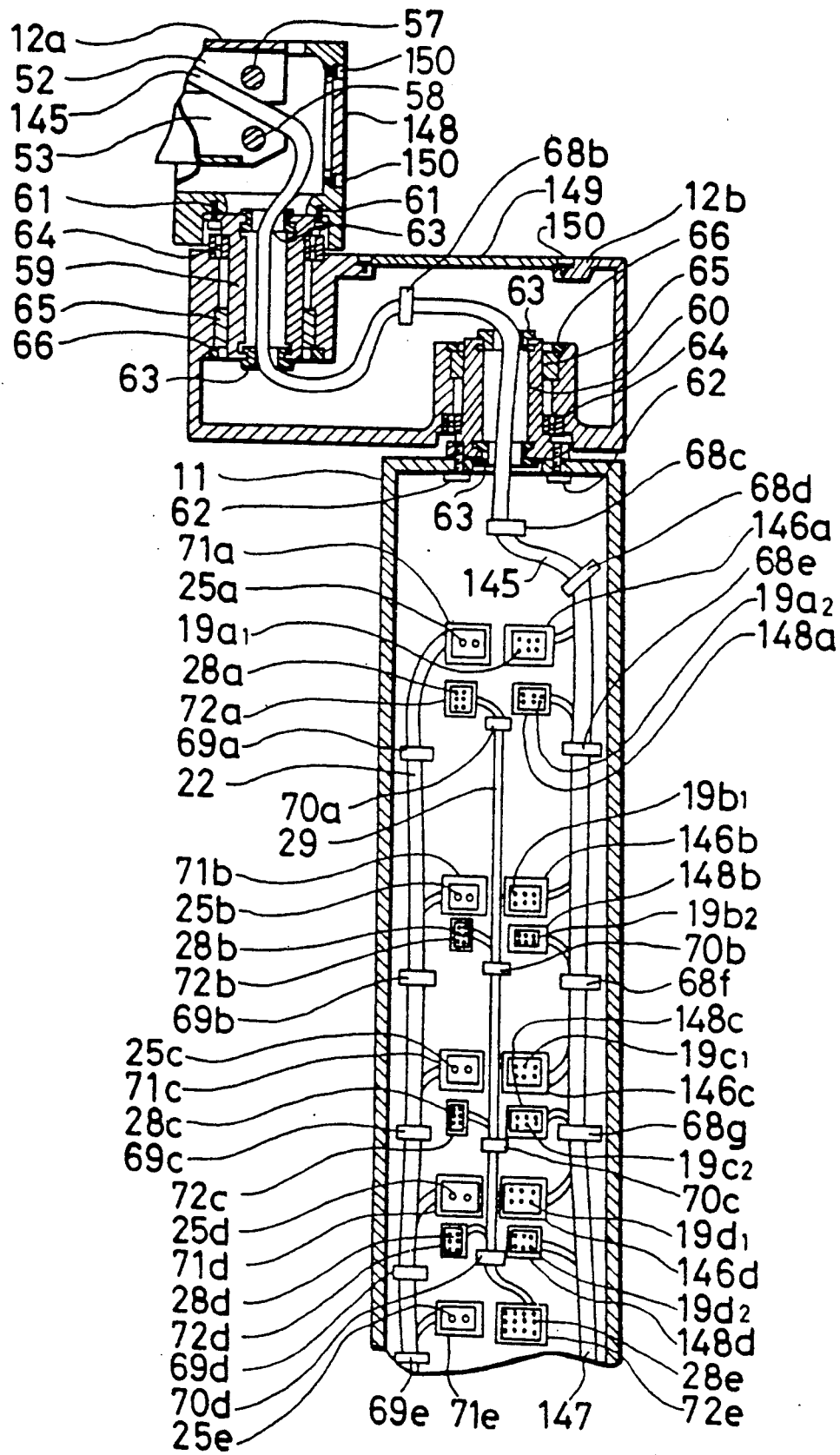
FIG. 46 is a sectional view illustrating internal cabling from the rear end of the long arm through the intermediate arm to the top of the stand in the Embodiment 7.

FIG. 46 is a sectional diagram illustrating internal cabling from the rear end of the long arm 12a through the intermediate arm 12b to the top of the stand 11. In the Embodiment 7, the connectors 19a, 19b, 19c and 19d are fixed to the inside wall of the stand 11 with connector supports 146a, 146b, 146c and 146d interposed respectively, and connectors 19$a_2$, 19$b_2$, 19$c_2$ and 19$d_2$ connected directly to a cord 147 are fixed to the inside wall of the stand 11 with connector supports 148a, 148b, 148c and 148d interposed respectively and connected to the foot switch unit 27. Further, cord retainers 68b, 68c, 68d, 68e, 68f and 68g retaining a cable 145 and a cord 147 are freely attachable and detachable to and from the inside wall of the stand 11. Furthermore, covers 148 and 149 are arranged on the rear surface of the long arm 12a and the top surface of the intermediate arm 12b respectively, and fixed with screws 150. The other structure of the Embodiment 7 is the same as that of the Embodiment 1.

Figure 47A:
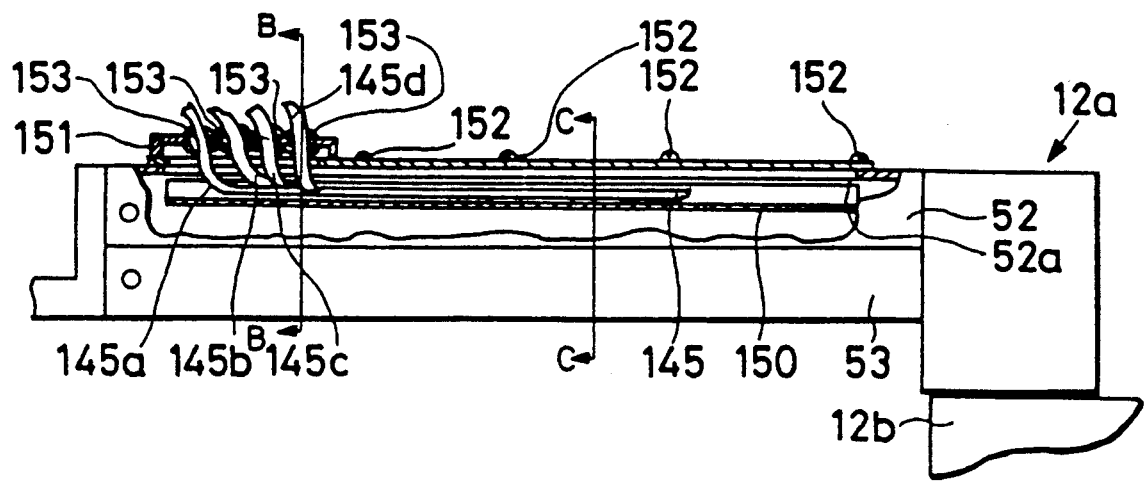
FIG. 47A, FIG. 47B and FIG. 47C are a partially broken side view, a sectional view taken along the B—B line in FIG. 47A and a sectional view taken along the C—C line in FIG. 47A respectively illustrating cabling in the tip of the long arm used in the Embodiment 7.
Figure 47B:
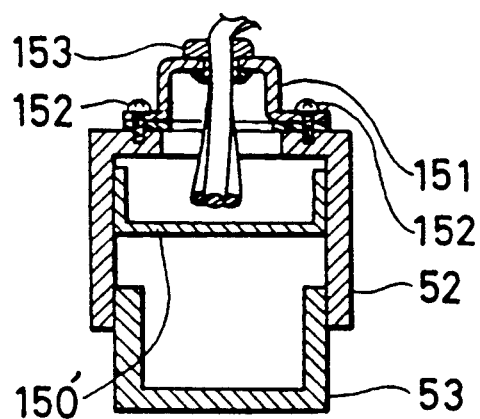
Figure 47C:
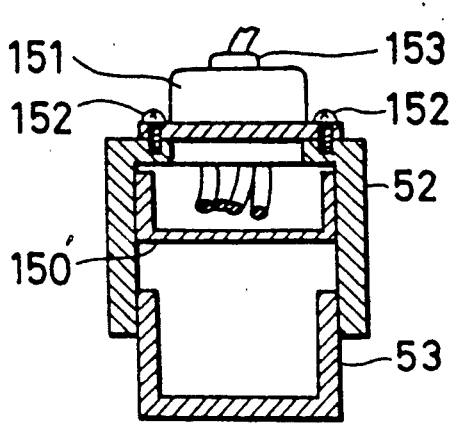

FIG. 47A, FIG. 47B and FIG. 47C are partially broken side views illustrating internal cabling in the tip of the long arm 12a of the Embodiment 7 wherein a cable 145 is a bundle of cords 145a, 145b, 145c and 145d connected directly to the magnification adjustment means, forcusing means, lamp illumination means and an option means respectively, and accommodated in an inner frame 150' arranged in the upper arm 52. Attached to the top of the upper arm 52 is a cover 151 with screws 152 so as to cover the aperture 52a of the upper arm, and the cables 145a, 145b, 145c and 145d are held with bushings 153 removably attached to said cover 151.

The Embodiment 7 having the composition described above can exhibit the same functions as those of the Embodiment 1 simply by setting the individual units into the stand 11, but has a simpler structure since no connector is attached to the tip of the arm. Further, should a cord is broken in the long arm 12a, intermediate arm 12b or stand 11, the Embodiment 7 permits easily repairing the cord since each of the long arm 12a and intermediate arm 12b has the detachable cover, and cord retainers 68b through 68g are freely attachable and detachable.

Though the cables from the operating means such as the magnification adjustment means pass through the arms and the stand, and are connected to the individual units through connectors in the Embodiment 7 described above, it is possible to lay the cables reversely, i.e., in such a manner that the cables extending directly from the individual units pass through the stand and arms, and are connected to the operating means through connectors attached to the tip of the arm as in the Embodiment 8 to be described below.

Figure 48A:
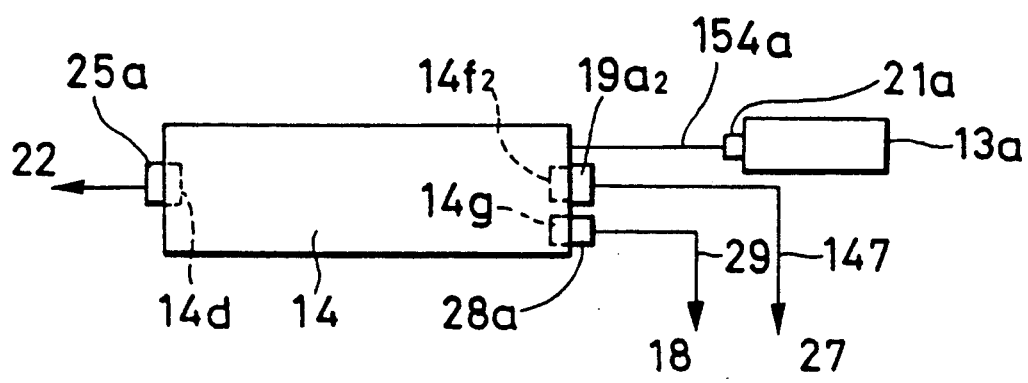
FIG. 48A and FIG. 48B are a block diagram and a perspective view respectively illustrating an electric magnification adjustment means used in an Embodiment 8 of the present invention.
Figure 48B:
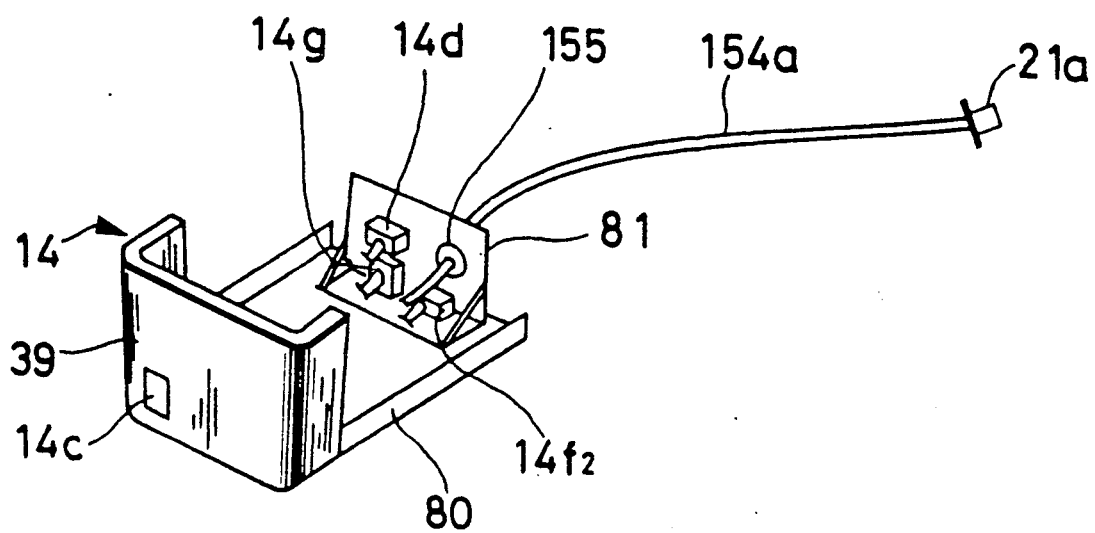
Figure 49:
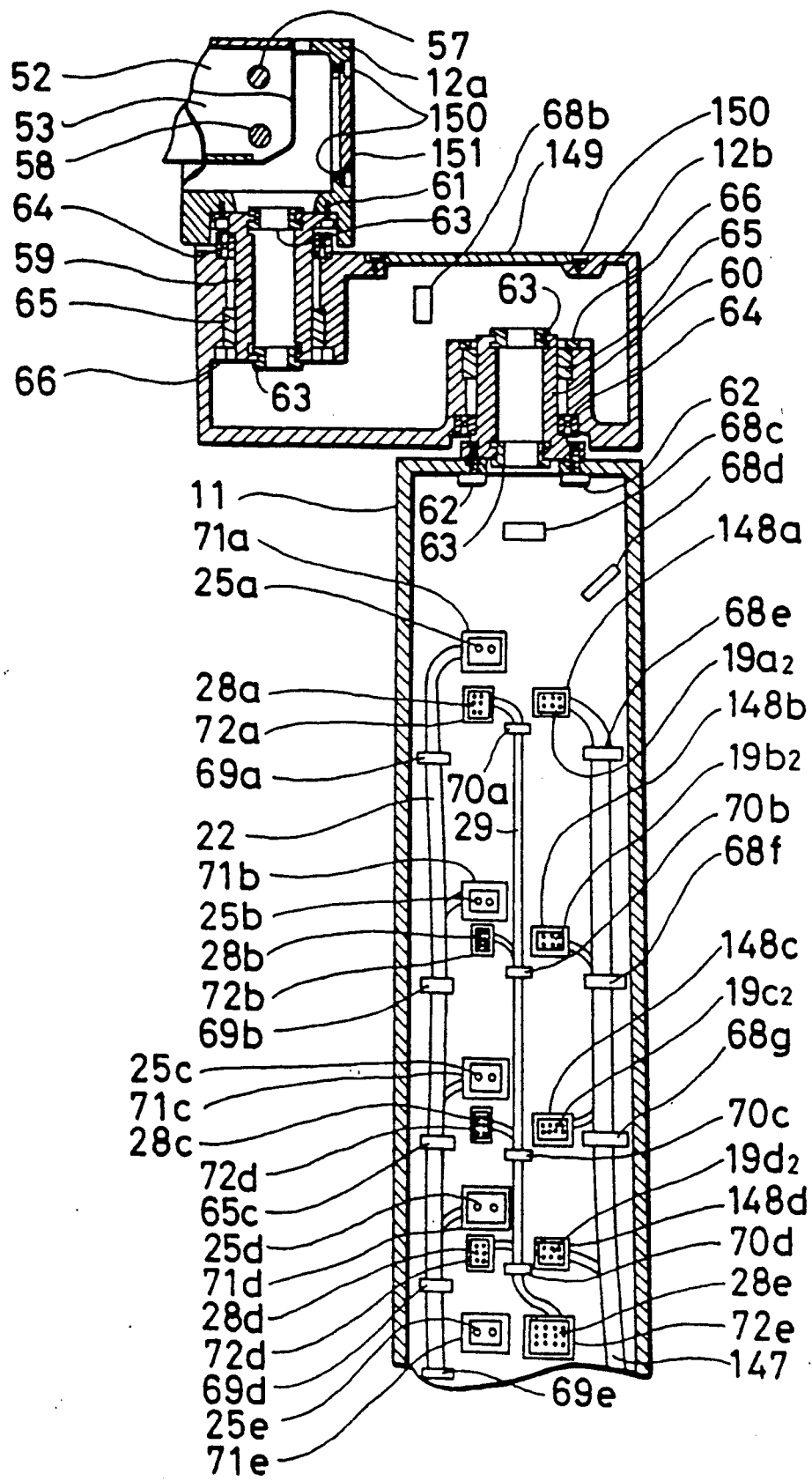
FIG. 49 is a sectional view illustrating internal cabling from the rear end of the long arm through the intermediate arm to the top of the stand in the Embodiment 8.
Figure 50:
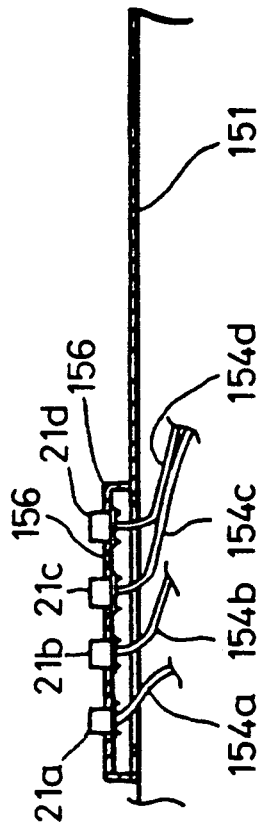
FIG. 50 is a sectional view illustrating cabling in the tip of the long arm used in the Embodiment 8.

FIG. 48A and FIG. 48B are a block circuit diagram and a perspective view of the electric magnification adjustment unit 14 selected as a typical example of the units used in the Embodiment 8, wherein a cord 154a is extended directly from the electric magnification adjustment unit 14 without using the connector 19a which is employed in the Embodiment 7, and the cord 154a is connected to the magnification adjustment means 13a through the connector 21a located on the tip of the arm. In this case, the cord 154a is sustained with a bushing 155 attached to a connector support plate 81. With regard to the other units, the cords to be connected to the operating means are extended directly from the units. On the other respects, structures of the individual units are the same as those in the Embodiment 7. FIG. 49 is a sectional view illustrating internal cabling from the rear end of the long arm 12a through the intermediate arm 12b to the top of the stand 11 in the Embodiment 8 and is the same as the sectional view of the Embodiment 7 (FIG. 46) from which the cable 55 and the connectors 19a, 19b, 19c and 19d are removed. In the Embodiment 8, the cords 154a, 154b, 154c and 154d (not shown) starting from the units 14, 15, 16 and 17 pass through the stand 11, intermediate arm 12b and long arm 12a, and connected directly to the connectors 21a, 21b, 21c and 21d respectively which are fixed to the cover 151 with screws 156 as shown in FIG. 50.

The Embodiment 8 having the structure described above exhibits the same functions as those of the Embodiment 1 when the operating means 13a, 13b, 13c and 13d are connected to the connectors 21a, 21b, 21c and 21d located on the tip of the arm, and facilitates to repair broken cords since the cords 154a, 154b, 154c and 154d extending from the individual units 14, 15, 16 and 17 can easily be attached and detached from any of the stand 11, intermediate arm 12b and long arm 12a.

Figure 51:
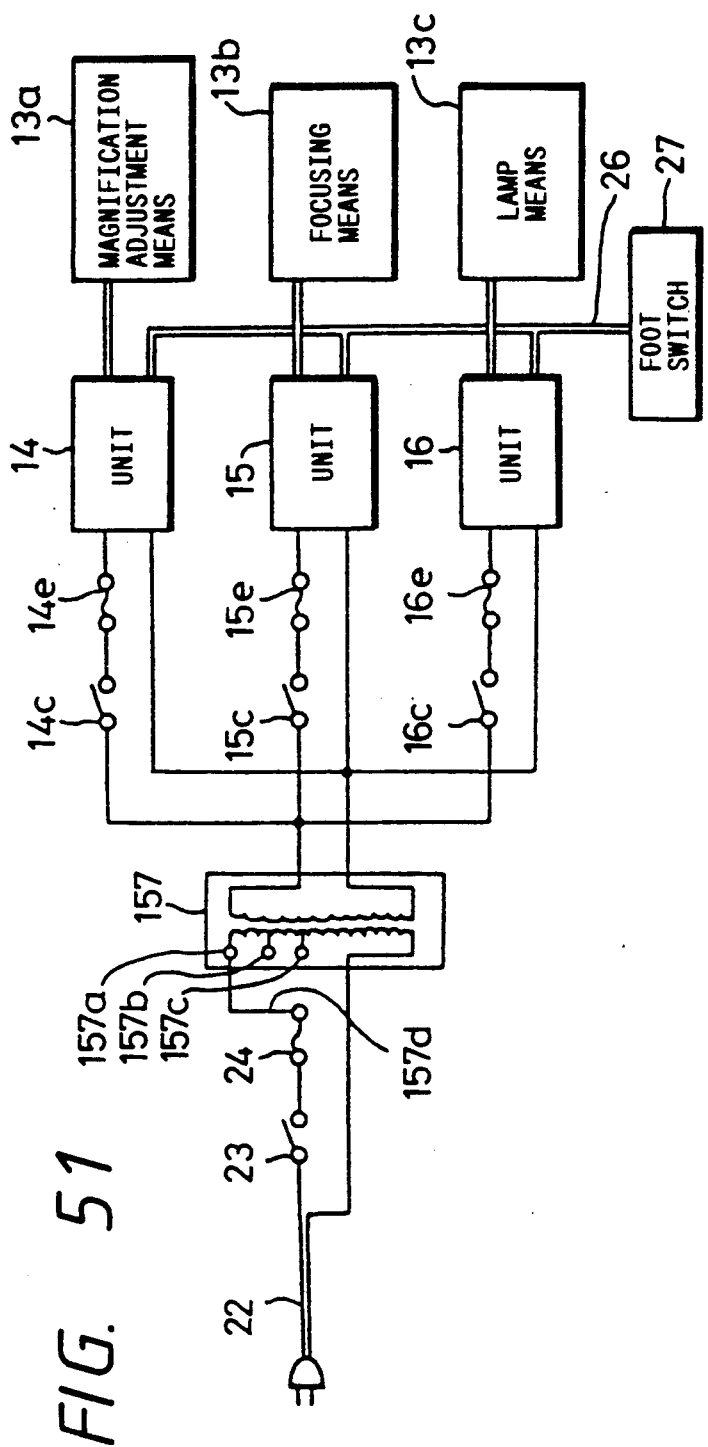
FIG. 51 is a block diagram illustrating an Embodiment 9 of the present invention.

Though the individual units are connected directly to the power source cable 22 in the Embodiments described above, it is permissible to interpose a primary transformer having a large capacity between the power source cable and the individual units as in the Embodiment 9 to be described below. FIG. 51 shows a block diagram of the Embodiment 9 wherein an input terminal 157d which permits selecting connection to the tap terminal 157a, 157b or 157c arranged on the primary side of the primary transformer 157 is connected to the overcurrent protector 24, and the secondary side of the primary transformer 157 is connected to the individual units 14, 15 and 16 respectively through the subswitches 14c, 15c and 16c as well as the individual overcurrent protectors 14e, 15e and 16e. With regard to the other respects of the fundamental configuration, the Embodiment 9 is the same as the Embodiment 1.

The Embodiment 9 having the configuration described above is capable of always providing the rated voltage to the individual units 14, 15 and 16 regardless of variations of local line power voltages, i.e., with no modification for a commercial line power voltage of 100 V, by connecting the input terminal 157d to the tap terminal 157d for a commercial line power voltage of 120 V, or connecting the input terminal 157d to the tap terminal 157c for a line power voltage of 240 V.

The Embodiment 9 comprising the primary transformer 157 has a merit to be compatible with different commercial line power voltages simply by modifying the connection to the tap terminals arranged on the primary transformer 157. Further, the Embodiment has another merit that the same units are usable with no modifications of the specifications therefor even when the surgical microscope is operated at different commercial line power voltages. Furthermore, the Embodiment 9 has a third merit to prevent the internal cabling between the primary transformer 157 and the individual unit from being complicated since the power source cable from the primary transformer 157 is sufficient for supplying powers to the individual units.

What is claimed is:

1. A surgical microscope comprising;
   a stand,
   an arm attached to the stand for sustaining a microscope body at the tip thereof,
   an electric equipment to be controlled, and
   an electric equipment for control,
   wherein said electric equipment for control is divided into a plurality of units,
   each of said units being housed in a removable module which is removably fitted to said stand,
   each of said units being equipped with a respective function control means having at least one specific function different from the functions of the other function control means,
   each of said units also being equipped with respective power source means connected to a respective function control means.

2. A surgical microscope according to claim 1 wherein said units are so adapted as to be connectable to a commercial line power outlet through subswitches connected respectively to said units and a main switch connected commonly to said subswitches.

3. A surgical microscope according to claim 1 wherein said units comprise said function control means and power source means connected directly to each other.

4. A surgical microscope according to claim 1 wherein said plurality of units are classified into a first unit group comprising said function control means and a second unit group comprising said power source means, said first unit group corresponds to said second unit group in a relation of 1:1, and the function control means and the power source means included in a pair of units are connected to each other.

5. A surgical microscope according to claim 1 wherein said plurality of units are classified into a first unit group comprising said function control means and a second unit group comprising said power source means, and at least two units belonging to said first unit group correspond to a single unit belonging to said second unit group, whereby said at least two function control means are connected to the single power source means.

6. A surgical microscope according to claim 1 wherein said plurality of units are classified into a first unit group comprising said function control means and a second unit group comprising said power source means, and a single unit belonging to said first unit group corresponds to at least two units belonging to said second unit group, whereby said single function control means is connected to said at least two power source means.

7. A surgical microscope according to any one of claims 1 through 6 wherein said each function control means and each power source means for the function means arranged in said microscope body are electrically connected to each other through connectors arranged at least one of the tip of said arm and said each unit.

8. A surgical microscope according to claim 1 wherein said units are vertically arranged with respect to one another on said stand.

9. A surgical microscope according to claim 1 further equipped with a self-judgment unit removably arranged on said stand, including an indication means for displaying operating conditions of said power source means and said plurality of function control means arranged in said units.

10. A surgical microscope according to claim 1 wherein said stand contains a space allowing arrangement of at least one spare unit in such a manner that the spare unit can be removed, piled up together with said units and connected to a commercial line power outlet through said main switch.

11. A surgical microscope according to claim 2 or 10 wherein said main switch is to be connected to said respective subswitches through a transformer.

* * * * *